United States Patent
Scheinuk

(10) Patent No.: US 10,944,729 B2
(45) Date of Patent: Mar. 9, 2021

(54) SYSTEM FOR SENDING VERIFIABLE E-MAIL AND/OR FILES SECURELY

(71) Applicant: ESIPCO. LLC, Metairie, LA (US)

(72) Inventor: Edward B. Scheinuk, Metaine, LA (US)

(73) Assignee: ESIPCO, LLC, Metairie, LA (US)

(*) Notice: Subject to any disclaimer, the term of this patent is extended or adjusted under 35 U.S.C. 154(b) by 285 days.

(21) Appl. No.: 15/988,751

(22) Filed: May 24, 2018

(65) Prior Publication Data
US 2019/0036889 A1    Jan. 31, 2019

Related U.S. Application Data

(60) Provisional application No. 62/510,569, filed on May 24, 2017, provisional application No. 62/562,893, (Continued)

(51) Int. Cl.
*H04L 29/06* (2006.01)
*H04L 9/32* (2006.01)
(Continued)

(52) U.S. Cl.
CPC ....... *H04L 63/0428* (2013.01); *G06Q 10/107* (2013.01); *H04L 9/0863* (2013.01);
(Continued)

(58) Field of Classification Search
CPC ... H04L 63/0428; H04L 9/0894; H04L 9/321; H04L 9/0863; H04L 9/3215;
(Continued)

(56) References Cited

U.S. PATENT DOCUMENTS

| 7,523,309 B1 | 4/2009 | Talbot et al. |
| 8,166,299 B2 | 4/2012 | Kemshall |
| (Continued) | | |

FOREIGN PATENT DOCUMENTS

| EP | 2685682 | 1/2014 |
| WO | 2006021170 | 3/2006 |
| (Continued) | | |

OTHER PUBLICATIONS

International Preliminary Report on Patentability dated Sep. 26, 2019 in PCT/US2018/034434.
(Continued)

*Primary Examiner* — Matthew Smithers
*Assistant Examiner* — Mirza Israr Javed
(74) *Attorney, Agent, or Firm* — Garvey, Smith & Nehrbass, Patent Attorneys, L.L.C.; Seth M. Nehrbass; Fabian M. Nehrbass

(57) ABSTRACT

A system for and method of transmitting verifiable e-mail includes a message ID sent to a recipient of the e-mail. A system for and method of transmitting encrypted files using e-mail and other electronic communication channels includes a computer program for storing encrypted files supplied by a user, creating a link to the encrypted files to be e-mailed to a recipient, allowing download of the encrypted files when an authorization code is provided after the link is used to go to a system server, wherein the authorization code is sent to a telephone of the recipient, via text or aurally.

39 Claims, 8 Drawing Sheets

Related U.S. Application Data filed on Sep. 25, 2017, provisional application No. 62/618,927, filed on Jan. 18, 2018, provisional application No. 62/675,578, filed on May 23, 2018.

(51) Int. Cl.
  *H04L 9/08*   (2006.01)
  *G06Q 10/10*  (2012.01)
  *H04L 12/58*  (2006.01)
  *H04W 4/12*   (2009.01)

(52) U.S. Cl.
  CPC ............ *H04L 9/0894* (2013.01); *H04L 9/321* (2013.01); *H04L 9/3215* (2013.01); *H04L 9/3226* (2013.01); *H04L 51/04* (2013.01); *H04L 51/08* (2013.01); *H04L 63/083* (2013.01); *H04L 63/0853* (2013.01); *H04L 63/0876* (2013.01); *H04L 63/123* (2013.01); *H04W 4/12* (2013.01)

(58) Field of Classification Search
  CPC . H04L 9/3226; H04L 63/0853; H04L 63/083; H04L 51/08; H04L 51/04; G06Q 10/107; H04W 4/12
  See application file for complete search history.

(56) References Cited

U.S. PATENT DOCUMENTS

| | | |
|---|---|---|
| 8,171,523 B2 | 5/2012 | Weksler et al. |
| 8,484,459 B2 | 7/2013 | Kalliola et al. |
| 8,521,821 B2 | 8/2013 | van der Horst et al. |
| 8,761,396 B2 | 6/2014 | Little et al. |
| 8,806,190 B1 | 8/2014 | Munshi et al. |
| 9,178,858 B1 | 11/2015 | Mussman et al. |
| 9,621,564 B1 | 4/2017 | Mussman et al. |
| 10,341,120 B2 | 7/2019 | Kallioniemi |
| 10,742,617 B2 | 8/2020 | Scheinuk |
| 2002/0019851 A1* | 2/2002 | Pollack .................. G06F 16/10 709/206 |
| 2004/0249895 A1 | 12/2004 | Way |
| 2005/0114652 A1 | 5/2005 | Swedor et al. |
| 2006/0020799 A1* | 1/2006 | Kemshall .............. H04L 63/166 713/170 |
| 2006/0031412 A1* | 2/2006 | Adams ................. G06F 21/6209 709/219 |
| 2006/0064581 A1 | 3/2006 | Miller et al. |
| 2007/0016613 A1* | 1/2007 | Foresti .................. G06Q 10/107 |
| 2008/0162527 A1* | 7/2008 | Pizano ............... G06Q 30/0251 |
| 2008/0165972 A1* | 7/2008 | Worthington ........... H04L 51/00 380/278 |
| 2008/0187140 A1 | 8/2008 | McGillian et al. |
| 2010/0217984 A1 | 8/2010 | Hill |
| 2010/0257352 A1* | 10/2010 | Errico ..................... G06F 21/32 713/151 |
| 2011/0202756 A1 | 8/2011 | West |
| 2012/0158877 A1* | 6/2012 | Shuster .................. H04L 51/12 709/206 |
| 2014/0101775 A1 | 4/2014 | Cheung et al. |
| 2015/0052355 A1 | 2/2015 | Munshi et al. |
| 2015/0073992 A1* | 3/2015 | Weiner .................. H04W 12/06 705/44 |
| 2015/0254467 A1* | 9/2015 | Leuthardt ............. G06F 21/606 726/28 |
| 2015/0271146 A1 | 9/2015 | Holyfield et al. |
| 2016/0065571 A1 | 3/2016 | Hoyos et al. |
| 2018/0152302 A1 | 5/2018 | Kallioniemi |
| 2018/0191686 A1 | 7/2018 | Ghafourifar |
| 2018/0288018 A1 | 10/2018 | Cooke |
| 2019/0036889 A1* | 1/2019 | Scheinuk ................ H04L 51/08 |

FOREIGN PATENT DOCUMENTS

| | | |
|---|---|---|
| WO | 2009156597 | 12/2009 |
| WO | 2011055002 | 5/2011 |
| WO | 2016170226 | 10/2016 |
| WO | WO2016170226 A1 | 10/2016 |
| WO | 2017033167 | 3/2017 |

OTHER PUBLICATIONS

International Search Report of the International Searching Authority, International App. No. PCT/US2018/034434, dated Aug. 30, 2018.

Written Opinion of the International Searching Authority, International App. No. PCT/US2018/034434, dated Aug. 30, 2018.

Sahay, Shobit, "One-Time Passcode for Office 365 Message Encryption" (https://www.microsoft.com/en-us/microsoft-365/blog/2014/10/03/one-time-passcode-office-365-message-encryption/), Oct. 3, 2014.

Notice of Allowance and Fees Due dated May 28, 2020 in related U.S. Appl. No. 16/607,590.

\* cited by examiner

Edward Scheinuk

/ 61

| From: | Edward Robinson |
| Sent: | Tuesday, July 1, 2018 8:08 AM |
| To: | Sean Jones |
| Subject: | Encrypted Communication |

> Notice_Email – Example T-A
> This email is one simple representation of a Notice_Email that would correspond with Possible Embodiment T-A and, as such, is subject to refinement by usability experts.

Dear Sean,

I am sending you files in encrypted form using an encryption service hosted by www.###trustedweb##.com. By following the instructions below, you will be able to:
1) Verify that this email is authentic and that it was sent to you by me.
2) Retrieve an Encrypted Package containing files and other information.
3) Decrypt the Encrypted Package and save the contents of the Encrypted Package on your computer.

----

1) To verify that this email is authentic:
   a) Copy the following web address and paste it into your web browser to navigate to the Verification web page.
      www.###trustedweb##.com/verify — 60
   b) Copy the Message ID Code shown below and paste it into the Message ID Code box on the Verification web page then click on the "*Verify*" button on the web page.
      Message ID Code: XG15J8UK — 62

After you click on the "*Verify*" button, the Verification web page will provide you with details on this email including confirmation of my identity, phone number, email address, physical address and company name.

2) The Verification web page will contain a link that will open the Authentication web page which will permit you to begin retrieval of the Encrypted Package after you verify this email to your satisfaction
   a) For security purposes, the Authentication web page will present you with a list of partially masked phone numbers including your phone number and you will need to click on your phone number to receive the Authentication Code which will be sent to your phone either as text message or AURALLY (spoken to you) in a phone call.
   a) After you receive the Authentication Code on your phone, you will enter it into the Authentication Code box on the Authentication web page then click on the "*Authenticate*" button.

After you authenticate as the intended recipient, a dialog box will open which will allow you to download the Encrypted Package to a location on your computer. If necessary, you will also be provided with an opportunity to download and install the decryption software required to decrypt the Encrypted Package.

3) After you have downloaded the Encrypted Package and installed the decryption software, you can double click on the Encrypted Package and you will be prompted to enter the following decryption password.
      Decryption Password: foxRun2?8 — 63

After the Encrypted Package is decrypted, you can save the files on your computer and delivery is complete.

*Ed*

Edward Robinson
New Orleans, LA
504.555.1212
erobinson@******.com

FIG. 1

Edward Scheinuk ─ 65

---

From: Edward Robinson (via ##trustedcloud##.com)
Sent: Tuesday, July 1, 2018 8:06 AM
To: Sean Jones
Subject: Encrypted Communication > Notice_Email – Example T-B
> This email is one simple representation of a Notice_Email that would correspond with Possible Embodiment T-B and, as such, is subject to refinement by usability experts.

Dear Sean,

I am sending you files in encrypted form using an encryption service hosted by www.##trustedcloud##.com. By following the instructions below, you will be able to:
1) Verify that this email is authentic and that it was sent to you by me.
2) Retrieve an Encrypted Package containing files and other information.
3) Decrypt the Encrypted Package and save the contents of the Encrypted Package on your computer.

---

1) To verify that this email is authentic:
   a) Copy the following web address and paste it into your web browser to navigate to the Verification web page.
      www.##trustedcloud##.com/verify ─── 60
   b) Copy the Message ID Code shown below and paste it into the Message ID Code box on the Verification web page then click on the [ Verify ] button on the web page.
      Message ID Code: SJ76K9IH ─── 62

After you click on the "*Verify*" button, the Verification web page will provide you with details on this email including confirmation of my identity, phone number, email address, physical address and company name.

2) The Verification web page will contain a link that will open the Authentication web page which will permit you to begin retrieval of the Encrypted Package after you verify this email to your satisfaction
   a) For security purposes, the Authentication web page will present you with a list of partially masked phone numbers including your phone number and you will need to click on your phone number to receive the Authentication Code which will be sent to your phone either as text message or AURALLY (spoken to you) in a phone call.
   b) After you receive the Authentication Code on your phone, you will enter it into the Authentication Code box on the Authentication web page then click on the "*Authenticate*" button.

After you authenticate as the intended recipient, a dialog box will open which will allow you to download the Encrypted Package to a location on your computer. If necessary, you will also be provided with an opportunity to download and install the decryption software required to decrypt the Encrypted Package.

3) After you have downloaded the Encrypted Package and installed the decryption software, you can double click on the Encrypted Package and you will be prompted to enter the following decryption password.
      Decryption Password: upGlas$7 ─── 63

After the Encrypted Package is decrypted, you can save the files on your computer and delivery is complete.

*Ed*

Edward Robinson
New Orleans, LA
504.555.1212
erobinson@******.com

FIG. 2

Hoke Medical Center — 70

| | |
|---|---|
| From: | Hoke Medical Center |
| Sent: | Tuesday, July 1, 2018 8:08 AM |
| To: | Sean Jones |
| Subject: | Encrypted Communication – Medical Records |

Notice_Email - Example T-C
This email is one simple representation of a Notice_Email that would correspond with Possible Embodiment T-C and, as such, is subject to refinement by usability experts.

Dear Mr. Jones,

We are sending you copies of invoices and associated medical records and reports that were submitted to your health insurer during the period June 1 to June 30, 2018. To protect your private information, these invoices, records, and reports are being sent to you in encrypted form. By following the instructions below, you will be able to:
1) Verify that this email is authentic and that it was sent to you by Hoke Medical Center.
2) Retrieve an Encrypted Package containing the invoices, records, and reports.
3) Decrypt the Encrypted Package and save the invoices, records, and reports on your computer.

1) To verify that this email is authentic:
   a) Copy the following web address and paste it into your web browser to navigate to the Verification web page.
      www.hokemedicalcenter.com/verify —— 60
   b) Copy the Message ID Code shown below and paste it into the Message ID Code box on the Verification web page then click on the [Verify] button on the web page.
      Message ID Code: J198KL3 —— 62
   After you click on the "*Verify*" button, the Verification web page will provide you with details on this email including confirmation of my identity, phone number, email address, physical address and company name.

2) The Verification web page will contain a link that will open the Authentication web page which will permit you to begin retrieval of the Encrypted Package after you verify this email to your satisfaction
   a) For security purposes, the Authentication web page will present you with a list of partially masked phone numbers including your phone number and you will need to click on your phone number to receive the Authentication Code which will be sent to your phone either as text message or AURALLY (spoken to you) in a phone call.
   c) After you receive the Authentication Code on your phone, you will enter it into the Authentication Code box on the Authentication web page then click on the "*Authenticate*" button.

After you authenticate as the intended recipient, a dialog box will open which will allow you to download the Encrypted Package to a location on your computer. If necessary, you will also be provided with an opportunity to download and install the decryption software required to decrypt the Encrypted Package.

3) After you have downloaded the Encrypted Package and installed the decryption software, you can double click on the Encrypted Package and you will be prompted to enter the following decryption password.
      Decryption Password: arc88lit? —— 63
   After the Encrypted Package is decrypted, you can save the files on your computer and delivery is complete.

Please contact us at (999) 555-1212 ext. 598 if you encounter problems retrieving your information.

Sincerely,

Hoke Medical Center
Invoicing and Medical Records

FIG. 3

John Smith ──────────────────────────────── 75

From: John Smith

Sent: Tuesday, July 4, 2017 8:08 AM

To: Mary Bass

Subject: Deal Points

> Verified_Email - Example V-A
> This email is one simple representation of a Verified_Email that would correspond with Possible Embodiment V-A and, as such, is subject to refinement by usability experts.

THIS EMAIL CAN BE VERIFIED AS AUTHENTIC BY ##trustedweb##.com.
Copy this Message ID – XG15J6UK – and go to www.##trustedweb##.com/verify and follow simple instructions 62                                                                                        60

Dear Mary,

If we are going to proceed with the deal involving Acme Widgets, we need to be sure that we are on the same page on a few items.

I have laid out a few scenarios and posted them on our Sharepoint server at www.xyzabc.com/acwidg.html Take a look at these items, give our position some thought, and then call to discuss further.

Thanks.

Best Regards,

*John*

John Smith
President

XYZABC Manufacturing, Inc.
123 Main Street
Anytown, CA 99999

FIG. 4

SYSTEM FOR SENDING VERIFIABLE E-MAIL AND/OR FILES SECURELY

CROSS-REFERENCE TO RELATED APPLICATIONS

My US Provisional Patent Applications Nos. 62/510,569, filed 24 May 2017; 62/562,893, filed 25 Sep. 2017, 62/618,927, filed 18 Jan. 2018, and 62/675,578, filed 23 May 2018, are incorporated herein by reference. Priority of those applications is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a system for sending files using e-mail and other electronic communication channels. More particularly, the present invention relates to a system for sending encrypted files using e-mail and other electronic communication channels.

2. General Background of the Invention

There are hundreds of methods of transmitting encrypted files. Unfortunately, lately, many of these methods involve a proposed recipient of the encrypted file to set up a user name and password in order to retrieve the file.

E-mails involving phishing schemes and other malicious e-messages are now harder than ever to detect, as they so resemble legitimate e-messages that recipients have a very difficult time determining when they should click on a link in an e-mail message or take action in response to one.

The following patent documents are incorporated herein by reference: U.S. Pat. Nos. 7,523,309; 8,171,523; 8,484,459; 8,521,821; 8,761,396; 8,806,190; 9,178,858; 9,621,564;

US Patent Application Publication Nos.: 2005/0114652; 2006/0064581; 2008/0165972; 2008/0187140; 2015/0052355

Patent/Publication Nos.: EP2685682A2; WO2017033167

BRIEF SUMMARY OF THE INVENTION

The present invention includes a system for transmitting verifiable e-mail.

Preferably, the sender must have a registered account with SST (Simple Secure Transfer—discussed below).

Optionally, the e-mail message could include some digits from the receiving user's phone number (such as last four).

Preferably the system is hosted by a trusted provider, such as HP, Apple, Microsoft, or Amazon that is secure, or some other universally recognized and trusted provider.

An embodiment of the present invention includes a system for sending an e-message to a receiving user which includes at least a web address of a trusted provider and instructions about either how to verify the sender of the e-message or how to securely download encrypted files, or both, the downloading of encrypted files being facilitated by a code sent to the telephone of the receiving user; how the e-message gets generated depends in part on whether the sender is an individual, or for example a commercial institution or a medical services provider having a database of information about customers or patients.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein:

FIG. 1 is an example of an e-mail message sent by the present invention;

FIG. 2 is another example of an e-mail message sent by the present invention;

FIG. 3 is a third example of an e-mail message sent by the present invention;

FIG. 4 is a fourth example of an e-mail message sent by the present invention;

DETAILED DESCRIPTION OF THE INVENTION

Information about these and other embodiments of the present invention can be found in my U.S. Provisional Patent Applications Nos. 62/510,569, 62/562,893, 62/618,927, and 62/675,578, all incorporated herein by reference.

The following is information about a most recent embodiment of the present invention, including a stand-alone system for verifying e-messages.

This version of SST+V Protocol includes

1) Delivery of the File_Address_Hyperlink and/or File_Address_Label by the SST_Server to a Recv_User as part of the Send_User_Verification_Protocol after Recv_User enters the Message_ID into the Verification_Site.

In doing so, this v2 version eliminates possibility of a blackhat inserting a valid Message_ID into a spoofed email containing a hyperlink which would access a malicious site or otherwise introduce malware into a Device or network or system utilized by Recv_User.

2) A stand-alone Send_User_Verification_Protocol that can be utilized by a registered Send_User to send an email whose origin can be verified by a Recv_User.

3) An embodiment where Notice_Emails and Verified_Emails are automatically verified by an Add-in to Recv_User's email program.

This version also includes the Send_User_Verification_Protocol on a NON-OPTIONAL basis whereas earlier versions reflected that the Send_User_Verification_Protocol was optional.

Figure 6:
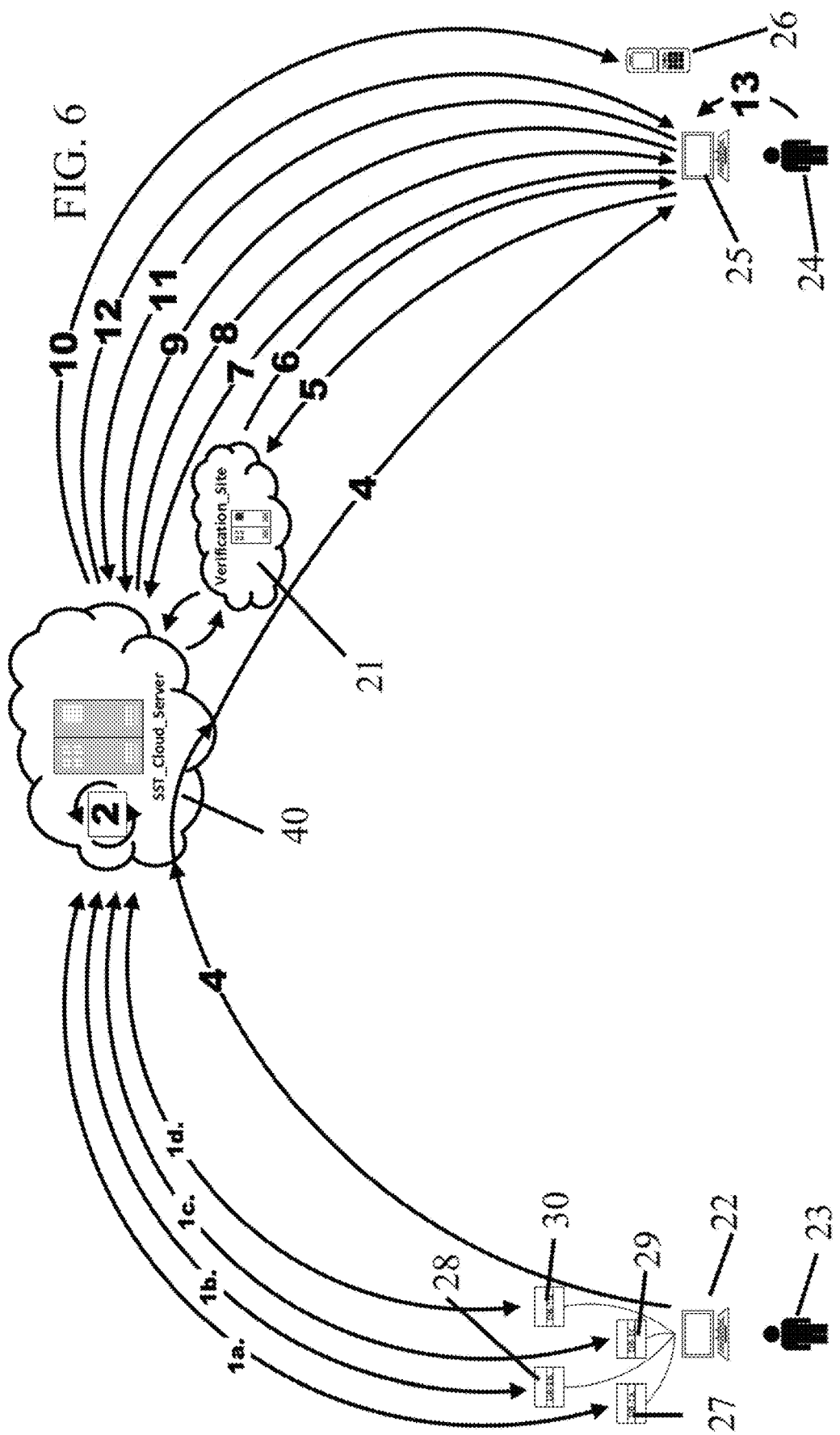
FIG. 6 is a schematic view of a preferred embodiment of the system of the present invention.
Figure 7:
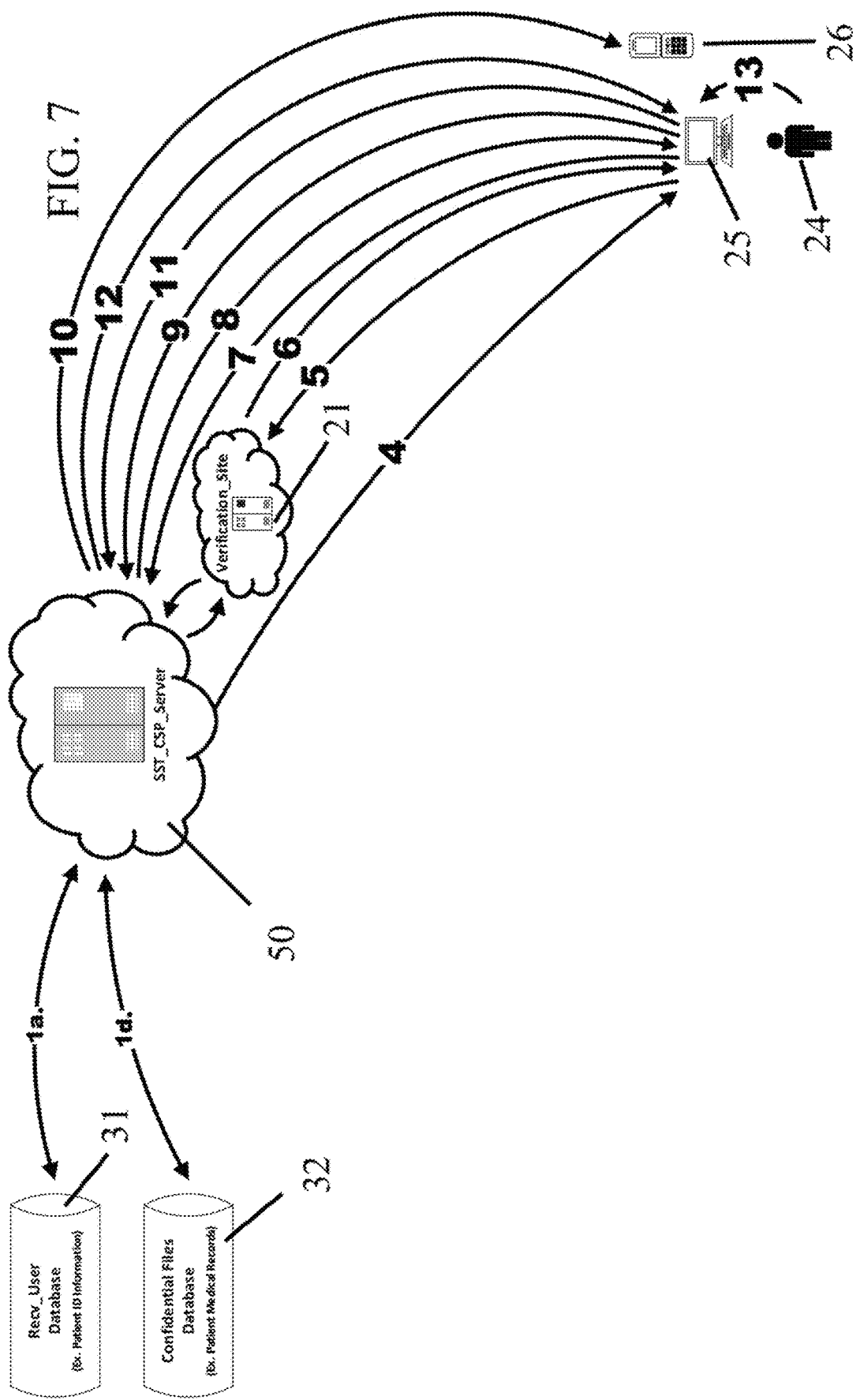
FIG. 7 is a schematic view of a preferred embodiment of the system of the present invention.

1) The Verification_Site 21 (FIGS. 5-8) may be hosted by an entity other than the entity which hosts an SST_Web_Server 20 (FIGS. 5 and 8), SST_Cloud_Server 40 (FIG. 6), or SST_CSP_Server 50 (FIG. 7).

2) The invention can include all possible implementations as noted in paragraph 5 of the Introductory Notes below.

Figure 5:
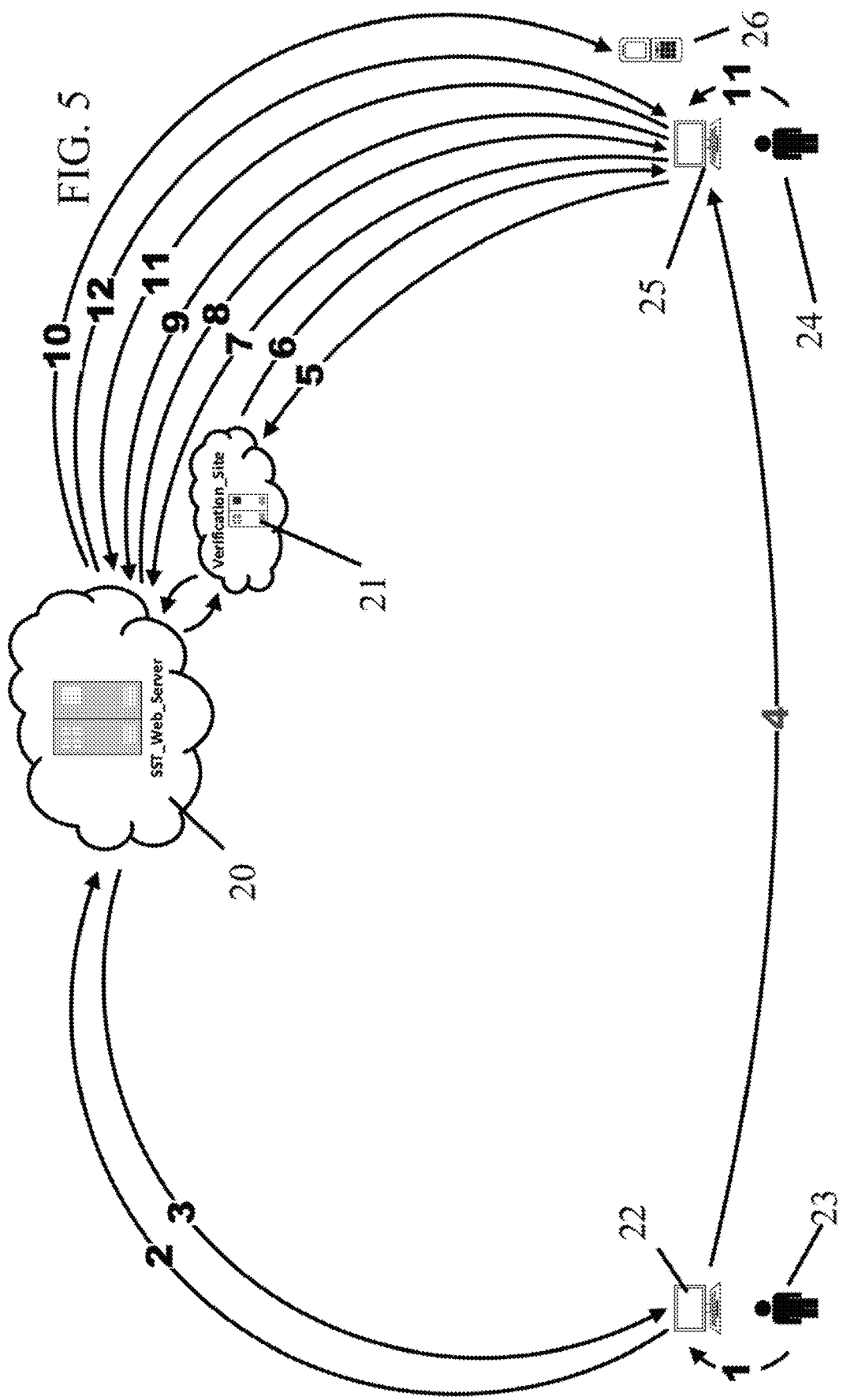
FIG. 5 is a schematic view of a preferred embodiment of the system of the present invention.

FIG. 1 is an example of an e-mail message 61 sent using the system and method of the present invention, as illustrated in the schematic view of FIG. 5. FIG. 5 is a schematic view of a preferred embodiment of the system of the present invention.

NOTE: Send_User 23 is a registered user of a Cloud_Service_Provider

1 While running SST_Local locally on Send_User Device 22, Send_User 23
  a. Enters Recv_User email address and phone number
  b. Creates Free_Text_File containing text that would normally be contained in body of Send_User email and/or
  c. Selects files to be transferred from storage accessible to Send_User 23 on Send_User Device 22 (local, network, cloud, etc.)
  d. Enters Encryption_PW (or opts to have SST_Local generate Encryption_PW)
  e. Encrypts selected files and/or Free_Text_File locally using universally available file combination and encryption software (ex. ZIP) and Encryption_PW to create Encrypted_PKG 2 SST_Local transmits to SST_Web_Server 20
  a. Send_User identity (Send_User is a registered user of Cloud_Service_Provider)
  b. Encrypted_PKG
  c. Email details (Send_User details, Recv_User email address and phone number, email size, dates, times, IP address, etc.)

3 SST_Local receives from SST_Web_Server
  a. Message_ID (text string, not a hyperlink)

4 Send_User 23 sends Notice_Email 61 (see FIG. 1) to Recv_User 24 with:
  a. Encryption_PW 63 (unmasked and plainly readable) *
  b. Message_ID
  c. Instructions for i) verifying Notice_Email 61; and, ii) retrieving and decrypting Encrypted_PKG 5 Recv_User 24
  a. Receives Notice_Email 61 from Send_User 23
  b. Following instructions, goes to Verification_Site 21 and enters Message_ID 62 to verify Send_User's identity and validity of Notice_Email 61

6 Verification_Site 21
  a. Returns Send_User 23 identity, email details, and email validity information corresponding with Message_ID 62 to Recv_User 24 (or warns of invalid Message_ID)
  b. Displays "Retrieve" button to permit Recv_User to retrieve File_Address_Hyperlink and/or File_Address_Label 7 If satisfied with Send_User 23 identity, email details, and email validity information provided by Verification_Site, Recv_User clicks "Retrieve" button to retrieve File_Address_Hyperlink and/or File_Address_Label 8 Verification_Site provides Recv_User 24 with File_Address_Hyperlink and/or File_Address_Label 9 Following instructions, Recv_User 24 requests Authentication_Code by either clicking File_Address_Hyperlink or entering File_Address_Label in browser address bar 10 SST_Web_Server 20 provides Authentication_Code to Recv_User 24 at Recv_User phone number (via SMS or aurally via PHONE CALL as opted by Recv_User)

11 Following instructions, Recv_User enters provided Authentication_Code delivered by text or aurally on phone 26 on webpage as requested by SST_Web_Server, using device 25 (for example, a person computer, laptop computer, tablet, or smart phone)

12 SST_Web_Server
  a. Uses Authentication_Code to confirm Recv_User 24 as intended recipient of Encrypted_PKG
  b. Downloads Encrypted_PKG to Recv_User Device 25

13 Following instructions, Recv_User 24 decrypts Encrypted_PKG using Encryption_PW and universally available file combination and encryption software (ex. ZIP) and saves file(s)

FIGS. 1 and 5 together illustrate a system for sending encrypted files, comprising a computer program accessed by a sending user 23 through a device 22,
  wherein the computer program prompts the sending user 23 to:
    choose a file or files on a computer (such as device 22, or another file location) controlled by the sending user 23 to be securely transferred;
  and wherein the computer program,
    prompts the sending user 23 for a phone number of a receiving user 24;
    uploads the file or files and receiving user phone number to a system server 20;
    enables the sending user to send the e-mail message 61 to the receiving user;
    displays a dialog box in a device 25 of the receiving user 24 when the receiving user 24 accesses the system server 20 and/or verification site 21 using information (such as web address 60 and message ID code 62) in the e-mail message 61, wherein the dialog box shows a portion of the phone number and prompts the receiving user 24 to choose whether to receive an authentication code via text message or via a voice call to the phone number;
    sends the authentication code to the phone number using the method chosen by the receiving user 24;
    prompts the receiving user 24 to enter the authentication code;
    confirms the accuracy of the authentication code for the file or files; and
    prompts the receiving user 24 to select a location to save the file or files. Preferably, the file or files are encrypted using a password 63 either chosen by the sending user 23 or provided by the computer program, and preferably the password 63 is displayed unmasked in e-mail message 61.

FIG. 2 is an example of an e-mail message 65 sent using the system and method of the present invention, as illustrated in the schematic view of FIG. 6. FIG. 6 is a schematic view of a preferred embodiment of the system of the present invention.

NOTE: Send_User 23 is a registered user of a Cloud_Service_Provider having an SST Cloud Server 40

1 SST_Cloud_Server 40 produces dialog boxes prompting Send_User 23 to
  a. Enter Recv_User 24 email address and phone number (dialog box 27)
  b. Create Free_Text_File containing text that would normally be contained in body of Send_User 23 email and/or (dialog box 28)
  c. Select files to be transferred from files stored with Cloud_Service_Provider or accessible on Send_User Device 22 (dialog box 29)
  d. Enter Encryption_PW 63 (or opt to have SST_Cloud_Server 40 generate Encryption_PW 63) (dialog box 30)

2 SST_Cloud_Server 40
 a. Encrypts selected files and/or Free_Text_File using universally available file combination and encryption software (ex. ZIP)
  and Encryption_PW 63 to create Encrypted_PKG
 b. Stores and indexes Encrypted_PKG and email details (Send_User 23 details, Recv_User 24 email address and phone number, email size, dates, times, IP address, etc.)
3 RESERVED FOR FUTURE USE
4 Send_User 23 (utilizing SST_Cloud_Server email toolset) sends Notice_Email 65 to Recv_User 24 with:
 a. Encryption_PW 63 (unmasked and plainly readable) *
 b. Message_ID 62
 c. Instructions for i) verifying Notice_Email 65; and, ii) retrieving and decrypting Encrypted_PKG
5 Recv_User 24
 a. Receives Notice_Email 65 from Send_User 23
 b. Goes to Verification_Site 21 and enters Message_ID 62 to verify Send_User's identity and validity of Notice_Email 65
6 Verification_Site 21
 a. Returns Send_User 23 identity, email details, and email validity information corresponding with Message_ID 62 to Recv_User 24 (or warns of invalid Message_ID)
 b. Displays "Retrieve" button to permit Recv_User 24 to retrieve File_Address_Hyperlink and/or File_Address_Label
7 If satisfied with Send_User identity, email details, and email validity information as provided by Verification_Site, Recv_User clicks "Retrieve" button to retrieve File_Address_Hyperlink and/or File_Address_Label
8 Verification_Site provides Recv_User 24 with File_Address_Hyperlink and/or File_Address_Label (such as textual web address which functions as a file identifier)
9 Following instructions, Recv_User 24 requests Authentication_Code by either clicking File_Address_Hyperlink or entering File_Address_Label in browser address bar
10 SST_Cloud_Server 40 provides Authentication_Code to Recv_User 24 at Recv_User phone number (via SMS or aurally via PHONE CALL as opted by Recv_User)
11 Following instructions, Recv_User 24 enters provided Authentication_Code received as a text or aurally on phone 26 on webpage as requested by SST_Cloud_Server 40 using device 25 Recv_User 24
12 SST_Cloud_Server 40
 a. Uses Authentication_Code to confirm Recv_User 24 as intended recipient of Encrypted_PKG
 b. Downloads Encrypted_PKG to Recv_User Device 25
13 Following instructions, Recv_User 24 decrypts Encrypted_PKG using Encryption_PW 63 and universally available file combination and encryption software (ex. ZIP) and saves file(s).

FIGS. 2 and 6 together illustrate a system for sending encrypted files, comprising a computer program accessed by a sending user 23 through a device 22,
 wherein the computer program prompts the sending user 23 to:
  choose a file or files on a computer (such as cloud server 40) controlled by the sending user 23 to be securely transferred; and,
  choose an encryption password 63;
 and wherein the computer program,
  encrypts the file or files using the encryption password 63;
  prompts the sending user 23 for a phone number of a receiving user;
  uploads the receiving user phone number to a system server 40;
  writes a link for accessing the encrypted file or files on the system server 40 into an e-mail message 65;
  writes the encryption password (unmasked) 63 into the e-mail;
  enables the sending user 23 to
 send the e-mail message 65 to the receiving user 24;
  displays a dialog box in a device 25 of the receiving user 24 (when the receiving user 24 accesses a verification site 21 using information (such as web address 60 and message ID code 62) in the e-mail message 65), wherein the dialog box shows a portion of the phone number and prompts the receiving user 24 to choose whether to receive an authentication code via text message or via a voice call to the phone number;
  sends the authentication code to the phone number using the method chosen by the receiving user;
  prompts the receiving user 24 to enter the authentication code;
  prompts the receiving user 24 to select a location to save the encrypted file or files;
  prompts the receiving user 24 to enter the encryption password 63 from the e-mail message;
  confirms the accuracy of the encryption password 63 and the authentication code for the encrypted files; and
  unencrypts the file or files and saves the unencrypted file or files to the location.

FIG. 3 is an example of an e-mail message 70 sent using the system and method of the present invention, as illustrated in the schematic view of FIG. 7. FIG. 7 is a schematic view of a preferred embodiment of the system of the present invention.

NOTE: Send_User is a Commercial_Service_Provider transferring confidential files and other confidential information to a group of Recv_User entities with existing relationships with the Commercial_Service_Provider which could include but not be limited to entities such as customers, employees, patients or trading partners.

1 SST_CSP_Server, 50 using data in possession of or otherwise accessible to the Commercial_Service_Provider to
 a. Generates a Recv_User_Data_File containing separate Recv_User_Data_Sets (email address and phone number) for each separate Recv_User 24
 b. Generates a unique Encryption_PW 63 for each separate Recv_User_Data_Set
 c. For each separate Recv_User, generates or retrieves confidential files and other confidential information to be transferred by SST_CSP_Server 50
 d. Uses universally available file combination/encryption software such as ZIP to combine and encrypt confidential files and other confidential information associated with each Recv_User_Data_Set using the corresponding Encryption_PW 63 to produce separate Encrypted_PKGs corresponding with each separate Recv_User_Data_Set.
 e. Generates a unique Message_ID 62 for each separate Recv_User_Data_Set
 f. Merges Recv_User_Data_Sets, Encrypted_PKGs, Encryption_PWs, and Message_IDs to create a separate CSP_Data_Set for each Recv_User 24
 g. Creates a CSP_Data_File containing all CSP_Data_Sets

2 RESERVED FOR FUTURE USE

3 RESERVED FOR FUTURE USE

4 Using the CSP_Data_File, SST_CSP_Server sends unique Notice_Emails 70 to each Recv_User with:

a. Unique Encryption_PW 63 (unmasked and plainly readable) * b. Unique Message_ID 62 c. Instructions for i) verifying Notice_Email 70; and, ii) retrieving and decrypting Encrypted_PKG 5 Recv_User 24 a. Receives Notice_Email 70 from Send_User (Commercial_Service_Provider)

b. Goes to Verification_Site 21 and enters Message_ID 62 to verify Send_User's identity and validity of Notice_Email 70

6 Verification_Site 21 a. Returns Send_User identity and email validity information corresponding with Message_ID 62 to Recv_User 24 (or warns of invalid Message_ID)

b. Displays "Retrieve" button to permit Recv_User 24 to retrieve File_Address_Hyperlink and/or File_Address_Label 7 If satisfied with Send_User identity, other email details, and email validity information as provided by Verification_Site 21, Recv_User 24 clicks "Retrieve" button to retrieve File_Address_Hyperlink and/or File_Address_Label 8 Verification_Site 21 provides Recv_User 24 with File_Address_Hyperlink and/or File_Address_Label 9 Following instructions, Recv_User 24 requests Authentication_Code by either clicking File_Address_Hyperlink or entering File_Address_Label in browser address bar 10 SST_CSP_Server 50 provides Authentication_Code to Recv_User 24 at Recv_User 24 phone number (via SMS or aurally via PHONE CALL as opted by Recv_User)

11 Following instructions, Recv_User enters provided Authentication_Code received on phone 26 by text or aurally on webpage as requested by SST_CSP_Server 50, using device 25

12 SST_CSP_Server 50 a. Uses Authentication_Code to confirm Recv_User 24 as intended recipient of Encrypted_PKG b. Downloads Encrypted_PKG to Recv_User Device 25

13 Following instructions, Recv_User 24 decrypts Encrypted_PKG using Encryption_PW and universally available file combination and encryption software (ex. ZIP) and saves file(s)

FIGS. 3 and 7 together illustrate a system for securely sending files, comprising a computer program accessed by a sending user 23, which allows the sending user 23 to:

choose a file or files to be encrypted and securely transferred;

and which:

allows the sending user 23 to designate a receiving user or users 24, the receiving user 24 having a phone number accessible to the computer program;

generates a first link (hyperlink or web address, for example) to the encrypted file or files to be included in an e-mail message 70 or is accessible through a second link (such as web address label 60);

which allows the receiving user 24 to:

receive the e-mail message 70 with at least the first link or the second link;

click on the link (or enter the link or web address 60 into a browser) and be presented with a dialog box requesting the authentication code;

receive the authentication code via the receiving user's telephone 26;

enter the authentication code into the dialog box requesting the authentication code;

be presented with a dialog box to select a location to save the encrypted file or files;

select the encrypted file or files and enter an encryption password for unencrypting the file or files;

save the unencrypted files or files to whatever location is desired by the receiving user. Multiple recipients 24 and multiple files can be designated at the same time by the sending user 23. E-mail addresses and telephone numbers of the multiple recipients are preferably accessible in a database 31 controlled by the computer program. The multiple files preferably are accessible in a repository 32 controlled by the computer program.

Figure 8:
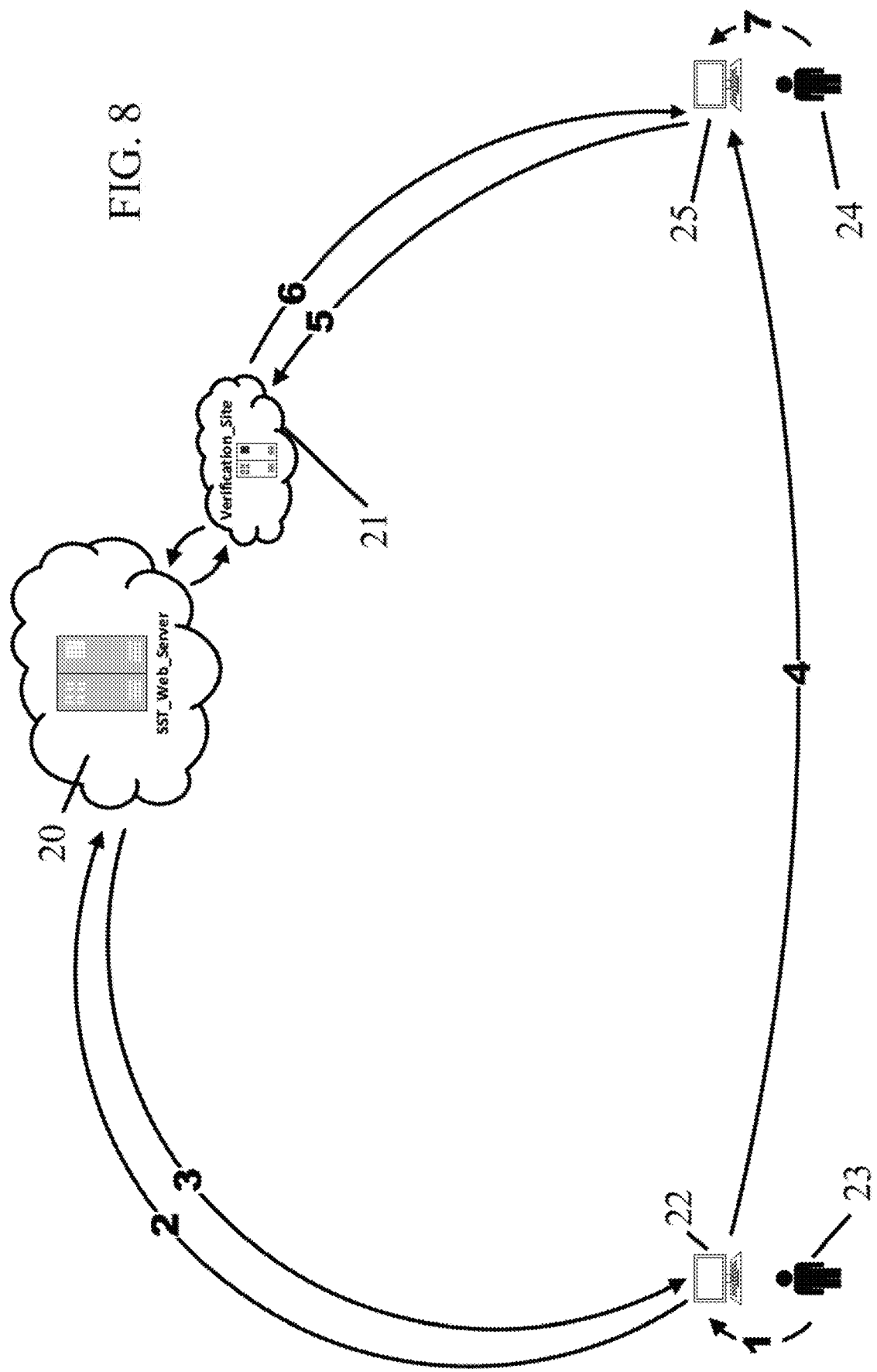
FIG. 8 is a schematic view of a preferred embodiment of the system of the present invention.

FIG. 4 is an example of an e-mail message 75 sent using the system and method of the present invention, as illustrated in the schematic view of FIG. 8. FIG. 8 is a schematic view of a preferred embodiment of the system of the present invention.

NOTE: Send_User 23 is a registered user of a Cloud_Service_Provider

1 While running SST_Local locally on Send_User Device 22, Send_User 23 a. Creates email that is to be sent as Verified_Email as normal including attachment of files, mail delivery options, etc.

b. Clicks "Send Verified" command button added by SST_Local

2 SST_Local transmits to SST_Web_Server 20 a. Send_User identity (Send_User 23 is a registered user of Cloud_Service_Provider)

b. Email details (Send_User details, Recv_User email address, email size, dates, times, IP address, etc.)

3 SST_Local receives from SST_Web_Server and writes following into email created by Send_User:

a. Message_ID 62 (text string, not a hyperlink)

b. Instructions for verifying Verified_Email using Message_ID 62

4 Send_User 23 sends email to Recv_User 24 as Verified_Email 75

5 Recv_User 24, upon receiving Verified_Email 75, goes to Verification_Site 21 and enters Message_ID 62 to verify Send_User's identity and validity of email 6 Verification_Site 21 returns Send_User 23 identity, email details, and email validity information corresponding with Message_ID 62 to Recv_User 24 (or warns of invalid Message_ID)

7 If satisfied with Send_User 23 identity and email validity information as provided by Verification_Site 21, Recv_User 24 reads and utilizes information contained in Verified_Email 75 with full trust and confidence in origin of Verified_Email 75

FIGS. 4 and 8 together illustrate a system for verifying the source and authenticity of an electronic mail message 75, the system for allowing a receiver 24 of an e-mail message 75 to verify the source and authenticity of the e-mail message 75 prior to taking any action related to the e-mail message 75. the system comprising:

a computer having a central processing unit and a server; and a device for receiving electronic mail messages;

wherein the computer assigns a unique text label 62 to an electronic mail message, the unique text label 62 corresponding to a sender 23;

the server hosts a verification website 21;
the computer includes the unique text label 62 and verification website 21 in the sender's electronic mail message 75 when the message is sent;
and, wherein, a receiver 24 of the electronic mail message 75 can access the verification site 21 on the server 20 using the device 25 for receiving electronic mail messages, and enter the unique text label;
the computer reveals to the receiver 24 the sender 23 that is associated with the unique text label 62.

Definitions

Authentication_Code—a code generated by SST_Server and sent to Recv_User via SMS or aurally via PHONE CALL in Recv_User_Authentication_Protocol and which Recv_User utilizes to retrieve Encrypted_PKG from SST_Server.
  Alternative embodiment—Widespread adoption of SST+V and the resultant increase in the number of registered users of SST+V could render worthwhile the addition of a third option for generation and delivery of the Authentication_Code to the Recv_User with the third option being delivery of the Authentication_Code using commonly available authentication applications which could include but not be limited to applications such as Microsoft Authenticator, Google Authenticator, Authy, and Symantec VIP.
Cloud_Service_Provider—a trusted provider of services accessible via electronic channels which could include but not be limited to the internet or an intranet, local area network or wide area network; i.e. "cloud services", which could include but not be limited to data storage and distribution services, email services, message services, shopping, business services or residential services. In the US, examples of organizations that could be considered to be Cloud_Service_Providers would be organizations similar to Apple, Google, Microsoft, IBM, HP/HPI/HPE, Amazon, Dropbox, Box, etc.
Commercial_Service_Provider—a provider of commercial services which could include but not be limited to banking, insurance, credit card issuance, healthcare, and telecommunications. While not always the case, a Commercial_Service_Provider would typically have a recurring need to transfer confidential files and other confidential information to others. In the US, examples of organizations that could be considered to be Commercial_Service_Providers would be organizations similar to Chase Bank, Aetna, Kaiser Permanente, Hospital Corporation of America, Visa International Member Banks, Verizon, Time-Warner, etc.
CSP_Data_File—a data file consisting of one or more CSP_Data_Sets.
CSP_Data_Set—a data set consisting of data elements corresponding with a single Recv_User which could include but not be limited to:
  1. Recv_User_Data_Set
  2. Encrypted_PKG
  3. Encryption_PW (or some portion thereof depending on the Encryption_PW_Delivery_Protocol implementation)
  4. Message_ID
Device—any form of electronic computing or communication device including but not limited to any Smartphone, Tablet, Personal computer (desktop, laptop or other form), Thin client computing device, Terminal (aka dumb terminal), Web-enabled television, or Web-enabled computer monitor.
Encrypted_PKG—an encrypted file, created using a universally available file combination/encryption software such as ZIP in conjunction with Encryption_PW, which could contain confidential files and other confidential information selected or created by Send_User for transfer to Recv_User.
Encryption_PW—a password provided by Send_User or generated by SST_Local or SST_Server which is used, in conjunction with a universally available file combination/encryption software such as ZIP, to combine/encrypt and decrypt/separate Encrypted_PKG.
Encryption_PW_Delivery_Protocol—the protocol by which Encryption_PW is delivered to Recv_User to permit Recv_User to decrypt and separate an Encrypted_PKG. Embodiments of the Encryption_PW_Delivery_Protocol could include but not be limited to:
  1. Delivery of the Encryption_PW in its entirety as plain readable text within the body of the Notice_Email.
  2. Delivery of the Encryption_PW in its entirety via SMS or aurally via PHONE CALL as part of the Recv_User_Authentication_Protocol.
  3. Delivery of one portion of the Encryption_PW as plain readable text within the body of the Notice_Email combined with delivery of the remaining portion of the Encryption_PW via SMS or aurally via PHONE CALL as part of the Recv_User_Authentication_Protocol.
File_Address_Hyperlink—a hyperlink randomly generated by SST_Server which corresponds uniquely with a single Encrypted_PKG and other associated information stored on SST_Server and which is used by a Recv_User to initialize the process of downloading Encrypted_PKG from SST_Server. While a File_Address_Hyperlink will correspond only with a single Encrypted_PKG, there is no limit to the number of File_Address_Hyperlinks that can correspond with the same Encrypted_PKG.
File_Address_Label—(alternative embodiment to File_Address_Hyperlink) a text label randomly generated by SST_Server which corresponds uniquely with a single Encrypted_PKG and other associated information stored on SST_Server and which is used by a Recv_User to initialize the process of downloading Encrypted_PKG from SST_Server. A File_Address_Label could be implemented in forms which could include but not be limited to a randomly generated code or a web address (without hyperlinking functionality). This alternative embodiment could provide a higher level of security and/or could be used if the state of global cyber security deteriorates to the point that users do not trust any hyperlinks regardless of source. While a File_Address_Label will correspond only with a single Encrypted_PKG, there is no limit to the number of File_Address_Labels that can correspond with the same Encrypted_PKG. A File_Address_Label could be delivered to Recv_User in lieu of a File_Address_Hyperlink or in addition to a File_Address_Hyperlink.
Free_Text_File—a file which could contain free text, including confidential information, equal to what would normally be included in the body of an email and which could be transferred in an Encrypted_PKG.
Message_ID—a text label randomly generated by SST_Server which corresponds uniquely with a single Notice_Email/Encrypted_PKG or Verified_Email and other associated information stored on SST_Server and which is used by a Recv_User to verify the source and authenticity of a Notice_Email or Verified_Email.

Message_ID_QRCode—a QR Code randomly generated by SST_Server which corresponds uniquely with a single Message_ID and which, through use of Message_ID_QRCode_App installed on a smartphone, may be used by a Recv_User to verify the source and authenticity of a Notice_Email or Verified_Email. Message_ID_QRCode_App—an "app" that is installed on a smartphone which can be used by a Recv_User to scan a displayed Message_ID_QRCode and which delivers relevant information about the Send_User to the Recv_User either directly through the Message_ID_QRCode_App or by linking to the Verification_Site.

Notice_Email—an email containing information and instructions relevant to the process of transferring confidential files and other confidential information using SST+V. Contents of a Notice_Email could include but not be limited to:
1. Instructions
2. Encrypted_PKG filename
3. Message_ID
4. Partially masked Recv_User phone number
5. Listing of files included in the Encrypted_PKG
6. Dependent upon which embodiment of the Encryption_PW_Delivery_Protocol is being utilized by SST_Server:
   a. None of the Encryption_PW, or
   b. A portion of the Encryption_PW, or
   c. All of the Encryption_PW Recv_User—an entity who is the intended recipient of a Notice_Email/Encrypted_PKG or a Verified_Email from a Send_User.

Recv_User_Authentication_Protocol—a protocol hosted by SST_Server within which:
1. A Recv_User provides confirmation to an SST_Server that the Recv_User is the intended recipient of a Notice_Email/Encrypted_PKG; and,
2. All or part of the Encryption_PW can be delivered to Recv_User in certain embodiments of SST+V and more specifically, the Encryption_PW_Delivery_Protocol.

Recv_User_Data_File—a data file consisting of one or more Recv_User_Data_Sets.

Recv_User_Data_Set—a data set consisting of data elements, corresponding with a single Recv_User to whom confidential files and other confidential information are to be transferred, which could include but not be limited to:
1. Email address
2. Phone number
3. Trading partner account number (applicable to a Commercial_Service_Provider)
4. Indicator denoting whether the Recv_User's email address is to be included in the TO or CC address field. It should be noted that in the embodiments described in the following, there is no option to send a BCC to another party.
   4.1. Alternative embodiment—an option to include a BCC Send_User could be added by means which could include but not be limited to implementing SST_Local so that it would produce a separate duplicate Notice_Email for each separate BCC recipient with each duplicate Notice_Email having its own unique Message_ID so that only the phone number for each unique BCC recipient was shown only to the corresponding BCC recipient during execution of the Recv_User_Authentication_Protocol.

Send_User—an entity (including but not limited to a Commercial_Service_Provider) that:
1. Needs to transfer confidential files and other confidential information in encrypted format to another entity; and/or,
2. Needs or wants to provide a means to verify its identity to the receiving entity Send_User_Verification_Protocol—a protocol hosted by SST_Server which:
1. Allows a Recv_User to verify the source and authenticity of a Notice_Email or Verified_Email prior to following any of the instructions or clicking on any of the links contained in the Notice_Email or Verified_Email. The Send_User_Verification_Protocol provides Recv_User with confidence that following any of the instructions or clicking on any of the links contained in the Notice_Email or Verified_Email will not access a malicious site or otherwise introduce malware into a Device or network or system utilized by Recv_User. The Send_User_Verification_Protocol can be initiated manually by a Recv_User or automatically by an add-in to Recv_User's email program or Device. Given the current state of global cyber security and in particular, the prevalence of phishing scams and other email hoaxes, the Send_User_Verification_Protocol, if incorporated into an implementation of SST+V, would provide recipients of a Notice_Email or Verified_Email with means to instantly and securely verify the authenticity of the Notice_Email or Verified_Email.
2. Provides a means for Recv_User to receive a File_Address_Hyperlink and/or a File_Address_Label via secure means from Service_Provider.

Service_Provider—a provider of SST+V services which could include but not be limited to:
1. A Cloud_Service_Provider
2. A Commercial_Service_Provider SST_Cloud_Server—a software program or application that runs on a computer processing system accessible via electronic channels which could include but not be limited to the internet or an intranet, local area network or wide area network; i.e. "cloud computer system", which is operated by or on behalf of a Service_Provider and which performs tasks which could include but not be limited to:
1. Registration of Send_Users (one time activity per Send_User)
2. Authentication of Send_User login credentials
3. Allowing a Send_User to:
   a. Create Recv_User_Data_Sets (with which SST_Cloud_Server could create Recv_User_Data_File)
   b. Select email delivery options (ex. delivery receipt, read receipt)
   c. Create a Free_Text_File
   d. Select confidential files and other confidential information to be transferred
   e. Enter an Encryption_PW (or have SST_Cloud_Server generate Encryption_PW at option of Send_User)
   f. Select usage restrictions for Encrypted_PKG (ex. expiration date, maximum number of downloads)
4. Generation of Encrypted_PKGs comprising Free_Text_Files and/or confidential files and other confidential information created or selected by Send_Users
5. Generation of Message_IDs
6. Generation of File_Address_Hyperlinks or File_Address_Labels
7. Generation of Notice_Emails to be sent to Recv_User(s) by Send_User using SST_Cloud_Server email functionality 8. Sending of Notice_Emails to Recv_Users using SST_Cloud_Server email functionality
9. Execution of the Send_User_Verification_Protocol
10. Execution of the Recv_User_Authentication_Protocol
11. Downloading Encrypted_PKGs to authenticated Recv_Users SST_CSP_Server—a computer processing system operated by or on behalf of a Commercial_Service_Provider which performs tasks which could include but not be limited to:
1. Compiling or generating information for each unique Recv_User as follows:
   a. Compile data elements in possession of or accessible to the Commercial_Service_Provider to create a Recv_User_Data_Set
   b. Compile confidential files and other confidential information to be transferred to Recv_User
   c. Generation of Encryption_PWs
   d. Generation of Encrypted_PKGs comprising confidential files and other confidential information
   e. Generation of Message_IDs
   f. Generation of File_Address_Hyperlinks and/or File_Address_Labels
2. Merging of Recv_User_Data_Sets, Encrypted_PKGs, Encryption_PWs, and
Message_IDs to create a separate CSP_Data_Set for each unique Recv_User
3. Creation of a CSP_Data_File containing all CSP_Data_Sets
4. Generation of Notice_Emails (with delivery options such as delivery receipt or return
receipt) for each CSP_Data_Set contained in a CSP_Data_File
5. Sending Notice_Emails to Recv_Users using SST_CSP_Server email functionality or
email systems of the Commercial_Service_Provider
6. Execution of the Send_User_Verification_Protocol
7. Execution of the Recv_User_Authentication_Protocol
8. Downloading Encrypted_PKGs to authenticated Recv_Users SST_Local—a software program or application that runs on a Device utilized by Send_User which, in conjunction with a computer processing system such as SST_Web_Server, performs tasks which could include but not be limited to allowing Send_User to:
1. Create Recv_User_Data_Set(s) (with which SST_Local could create a Recv_User_Data_File)
2. Select email delivery options (ex. Delivery Receipt, Read Receipt)
3. Create a Free_Text_File
4. Select confidential files and other confidential information to be transferred
5. Enter Encryption_PW (or have SST_Local generate Encryption_PW at option of Send_User)
6. Select usage restrictions for Encrypted_PKG (ex. expiration date, maximum number of downloads)
7. Generate Encrypted_PKG comprising Free_Text_File and/or confidential files and other confidential information created or selected by Send_User
8. Upload Send_User registration information to SST_Web_Server
9. Upload Encrypted_PKG to SST_Web_Server
10. Dependent upon which embodiment of the Encryption_PW_Delivery_Protocol is being utilized SST_Server, upload:
    a. None of the Encryption_PW, or
    b. A portion of the Encryption_PW, or
    c. All of the Encryption_PW
11. Upload Recv_User_Data_File to SST_Web_Server
12. Generate Notice_Email to be sent to Recv_User(s) by Send_User using Send_User's existing email application
13. Send Notice_Email to Recv_User(s) using Send_User's existing email application SST_Server—a computer processing system or software program or application including but not limited to:
1. An SST_Cloud_Server
2. An SST_CSP_Server
3. An SST_Web_Server SST_Server_Console—a software program or application accessible via electronic channels which could include but not be limited to the internet or an intranet, local area network or wide area network which permits a Send_User or other authorized user to review details of Notice_Emails and/or transfers of Encrypted_PKGs or details of Verified_Emails created and/or delivered using SST_Server on which SST_Server_Console is running.

SST_Web_Server—a computer processing system accessible via electronic channels which could include but not be limited to the internet or an intranet, local area network or wide area network; i.e. "cloud computer system", which is operated by or on behalf of a Cloud_Service_Provider and which, in conjunction with programs or applications such as SST_Local, performs tasks which could include but not be limited to:
1. Registration of Send_Users (one time activity per Send_User)
2. Authentication of Send_User login credentials (directly or through SST_Local)
3. Receiving and storing Send_User registration information
4. Receiving and storing Encrypted_PKGs
5. Dependent upon which embodiment of the Encryption_PW_Delivery_Protocol is being utilized by SST_Server, receiving and storing:
   a. None of the Encryption_PW, or
   b. A portion of the Encryption_PW, or
   c. All of the Encryption_PW
6. Receiving and storing Recv_User_Data_Files
7. Generation of Message_IDs
8. Generation of File_Address_Hyperlinks and/or File_Address_Labels
9. Execution of the Send_User_Verification_Protocol
10. Execution of the Recv_User_Authentication_Protocol
11. Downloading Encrypted_PKGs to authenticated Recv_Users Verification_Site—a web site or webpage which is operated by or on behalf of a Service_Provider that is accessed by a Recv_User as part of the Send_User_Verification_Protocol.

Verified_Email—an email (other than a Notice_Email) that includes a Message_ID which allows a Recv_User to verify the identity of Send_User prior to following any of the instructions or clicking on any of the links contained in the Verified_Email (other than the instructions about how to use the Message_ID to verify the Email).

Introductory Notes

Items in Bold are defined in Definitions section beginning on page 13.
1. Simple Secure Transfer plus Verification ("SST+V") permits the following activities independently or in combination:
   1.1. TRANSFER of confidential files and other confidential information, including but not limited to data files and free text message files, in encrypted form securely over electronic channels which could include but not be limited to the internet or an intranet, local area network or wide area network, using simple means and methods which eliminate unwieldy protocols of currently utilized methods. Of particular note, and as opposed to the unwieldy protocols and requirements of currently utilized methods of transferring confidential files and other confidential information, SST+V does not require that a recipient be registered with SST+V or any other website in order to receive confidential files and other confidential information.

1.2. VERIFICATION by the recipient of an email of the identity of the email's sender prior to the recipient's following any of the instructions or clicking on any of the links or opening any of the attachments in the email. This verification component provides the recipient with confidence that taking any such actions will not access a malicious site or otherwise introduce malware into the recipient's device or any network or system utilized by the recipient.

2. In addition to permitting transfers of confidential files and other confidential information, SST+V can also be utilized on a large scale to distribute to multiple parties, confidential files and other confidential information unique to each party, in encrypted form securely over electronic channels which could include but not be limited to the internet or an intranet, local area network or wide area network, utilizing the same simple means and methods and without requiring that any recipient register with or log into any website in order to receive such confidential files and other confidential information. Examples of such large scale utilization could include but not be limited to distribution of:

2.1. Periodic statements by a bank or credit card issuer;
2.2. Trade confirmations by a brokerage firm;
2.3. Health information such as medical records and insurer Explanation of Benefits forms;
2.4. Communications with a healthcare provider. Typically communications sent by such entities require intended recipients of information to log in to receive the information (as do Morgan Stanley, Vanguard, and other companies).

3. Because the confidential files and other confidential information are encrypted for the entirety of the time that they are transiting electronic channels, SST+V provides a higher level of security for the confidential files and other confidential information than current methods such as the method where, after logging into a website, the recipient downloads an unencrypted version of the confidential files and other confidential information over such electronic channels where security levels are unknown or may be questionable.

4. The TRANSFER component of SST+V operation is based on the presumption that any time that an entity has a need to send confidential files and other confidential information to another entity, the sending entity has more than a casual acquaintance with the receiving entity and, in addition to an email address, the sending entity would already possess or be able to easily obtain a phone number for the receiving entity. Similarly, a receiving entity who would be in a position to receive confidential files and other confidential information from a sending entity will generally recognize the identity of the sending entity or a related entity that is tasked with the actual sending of the confidential files and other confidential information.

5. SST+V could be implemented in many programmatic forms including but not limited to forms such as:

5.1. An Add-In to the existing email program installed on a Device utilized by Send_User.
  5.1.1. If the existing email program incorporated a Contacts feature, the Add-In could be implemented so that the Send_User could, using the feature set of the Contacts feature, easily retrieve the email address and telephone number of a Contact to whom a Notice_Email/Encrypted_PKG is to be sent for use in the process of compiling the data elements necessary to effect a transfer.

5.2. A software program module integrated into the existing email program installed on a Device utilized by Send_User.
  5.2.1. If the existing email program incorporated a Contacts feature, the software program module could be implemented so that the Send_User could, using the feature set of the Contacts feature, easily retrieve the email address and telephone number of a Contact to whom a Notice_Email/Encrypted_PKG is to be sent for use in the process of compiling the data elements necessary to effect a transfer.

5.3. A separate software program installed on a Device utilized by Send_User which would initiate the existing email program or application utilized by Send_User at some point during execution of, or after completion of the processes which precede the formation of the email message to the Recv_User.

5.4. A software program running on computer processing systems utilized by a provider of commercial services that, using data in possession of or accessible to the commercial services provider, would execute large scale distributions of confidential files and other confidential information to other parties which could include but not be limited to customers, employees, patients, and trading partners.

5.5. An Add-In to the Data Loss Prevention software utilized by an entity or organization which would initialize based on elected trigger options set within the Data Loss Prevention software.

5.6. A software program module integrated into Data Loss Prevention software utilized by an entity or organization which would initialize based on elected trigger options set within the Data Loss Prevention software.

5.7. An application hosted by a Service_Provider that is accessible by Send_User via electronic channels which could include but not be limited to the internet or an intranet, local area network or wide area network.
  5.7.1. To improve the security of an Encrypted_PKG, it would be preferred that email processes and SST+V processes be segregated within a computer processing system so that process of generating a Notice_Email containing an Encryption_PW is separated from the processes that create, store, and deliver the Encrypted_PKG.

5.8. An application hosted by a Service_Provider that is accessible by Send_User via electronic channels which could include but not be limited to the internet or an intranet, local area network or wide area network which provides email services.
  5.8.1. To improve the security of an Encrypted_PKG, it would be preferred that email processes and SST+V processes be segregated within a computer processing system so that process of generating a Notice_E- mail containing an Encryption_PW is separated from the processes that create, store, and deliver the Encrypted_PKG.
  5.9. An application hosted by a Service_Provider that is accessible by Send_User via electronic channels which could include but not be limited to the internet or an intranet, local area network or wide area network which provides data storage and data distribution services.
    5.9.1. To improve the security of an Encrypted_PKG, it would be preferred that email processes and SST+V processes be segregated within a computer processing system so that process of generating a Notice_Email containing an Encryption_PW is separated from the processes that create, store, and deliver the Encrypted_PKG.
6. A Recv_User_Authentication_Protocol is incorporated into SST+V which requires a Recv_User to verify to an SST_Server that the Recv_User is the intended recipient of an Encrypted_PKG. In certain embodiments of SST+V, all or part of the Encryption_PW is delivered to Recv_User as part of the Recv_User_Authentication_Protocol.
7. A Send_User_Verification_Protocol is incorporated into SST+V which
  7.1. Allows a Recv_User to verify the source and authenticity of a Notice_Email prior to following any of the instructions or clicking on any of the links contained in the Notice_Email. The Send_User_Verification_Protocol provides Recv_User with confidence that following any of the instructions or clicking on any of the links contained in the Notice_Email will not access a malicious site or otherwise introduce malware into a Device or network or system utilized by Recv_User. The Send_User_Verification_Protocol can be initiated manually by a Recv_User or automatically by an add-in to Recv_User's email program or Device. Given the current state of global cyber security and in particular, the prevalence of phishing scams and other email hoaxes, the Send_User_Verification_Protocol, if incorporated into an implementation of SST+V, would provide recipients of a Notice_Email with means to instantly and securely verify the authenticity of the Notice_Email.
  7.2. Provides a means for Recv_User to receive a File_Address_Hyperlink and/or a File_Address_Label via secure means from a Service_Provider.
8. Send_User Registration
  8.1 Send_User registration with a Service_Provider is required unless the Send_User and Service_Provider are the same entity as would be the case with a Commercial_Service_Provider such as a bank using SST+V to distribute periodic statements.
  8.2. Registration information required by a Service_Provider that is a Cloud_Service_Provider could include but not be limited to:
    8.2.1. A verified email address for Send_User.
    8.2.2. A verified phone number for Send_User that Recv_User can use to reach Send_User as desired to further verify Notice_Email authenticity.
    8.2.3. A verified physical or mailing address.
    8.2.4. Other unique identifying information (organization name, address, etc.).
    8.2.5. Optional payment information.
  8.3. For larger organizations which utilize SST+V for transfers of confidential files and other confidential information, multiple levels of registration could be available to provide management with the ability to monitor and enforce information security protocols, ensure compliance with organization and regulatory rules and requirements, and to undertake other organization imperatives.
9. Recv_User Registration
  9.1. Recv_User registration is NOT REQUIRED.
Transfer of Encrypted Files by Send_User
The following outline of a possible embodiment is based on implementation of SST+V, including the incorporation of the Send_User_Verification_Protocol, by a Cloud_Service_Provider as an Add-In to an existing email program installed on a Device utilized by Send_User which runs on Send_User Device as SST_Local. Send_User is presumed to be registered with and to have already authenticated/logged in to the Cloud_Service_Provider.

Possible Embodiment T-A

1. Send_User opens Send_User's existing email program on Send_User Device
2. Send_User clicks SST+V "Transfer Files" Add-In command button in existing email program
3. SST_Local then:
  3.1. Opens Dialog Box which allows Send_User to:
    3.1.1. Create a Recv_User_Data_Set for each of one or more Recv_User(s) by entering required data elements of a Recv_User_Data_Set
    3.1.2. Elect whether to request email delivery receipt
    3.1.3. Elect whether to request email return receipt
4. Send_User then:
  4.1. Enters required data elements of a Recv_User_Data_Set for each intended Recv_User
    4.1.1. Alternative embodiment—if the existing email program of Send_User incorporates a Contacts feature, SST_Local could include functionality that would permit Send_User to add required Recv_User_Data_Set data elements for an intended Recv_User whose contact information exists in Contacts by clicking on or dragging and dropping the Recv_User's contact information as contained in the Contacts feature
    4.1.2. Elects whether to request email delivery receipt
    4.1.3. Elects whether to request email return receipt
  4.2. Closes Dialog Box affirmatively
5. SST_Local then:
  5.1. Creates and saves Recv_User_Data_File using Recv_User_Data_Set(s) created by Send_User
  5.2. Saves email delivery receipt election
  5.3. Saves email return receipt election
  5.4. Opens Dialog Box which allows Send_User to:
    5.4.1. At option of Send_User, compose a Free_Text_File that will be securely transferred in the Encrypted_PKG
      It should be noted that creation of a Free_Text_File is not mandatory and that SST+V can be utilized to securely transfer data file(s) without an accompanying Free_Text_File.
6. Send_User then:
  6.1. Optionally, composes the contents of what will become the Free_Text_File using the text editing toolset offered by SST_Local which could include but not be limited to Rich Text or HTML editing tools
    It should be noted that creation of a Free_Text_File is not mandatory and that SST+V can be utilized to securely transfer data file(s) without an accompanying Free_Text_File.
   6.2. Closes Dialog Box affirmatively
7. SST_Local then:
   7.1. Creates and saves Free_Text_File if Send_User has opted to compose one
   7.2. Opens Dialog Box which allows Send_User to:
      7.2.1. At option of Send_User, choose data file(s) that will be securely transferred in the Encrypted_PKG
         It should be noted that selection of data file(s) is not mandatory and that SST+V can be utilized to securely transfer a Free_Text_File without accompanying data file(s).
      7.2.2. Elect whether to include in unencrypted form in the body of the Notice_Email to Recv_User a file listing of the files, including any Free_Text_File file, to be transferred along with the respective file information of each such file which could include but not be limited to filename, file type, file size, date/time created, etc. with the file listing to be provided (while transfer of files that must be transferred under high security conditions might dictate that neither a file listing nor any other file information be provided in unencrypted form, inclusion of such information would provide an audit trail in the email systems of both the Send_User and the Recv_User of files sent by Send_User and received by Recv_User through SST+V)
8. Send_User then:
   8.1. Optionally, selects the data file(s) accessible on Send_User Device (including but not limited to local device storage and/or removable device storage and/or cloud storage and/or network storage locations) that are to be securely transferred
      It should be noted that selection of data file(s) is not mandatory and that SST+V can be utilized to securely transfer a Free_Text_File without accompanying data file(s).
   8.2. Elects whether to include a listing of files to be transferred, including any Free_Text_File, and respective file information in unencrypted form in the body of the Notice_Email to Recv_User
   8.3. Closes Dialog Box affirmatively
9. SST_Local then:
   9.1. Creates and saves list of selected data file(s), if any, and/or a Free_Text_File, if any, to be securely transferred
   9.2. Opens Dialog Box which allows Send_User to:
      9.2.1. Choose between:
         9.2.1.1. Providing and entering an Encryption_PW
         9.2.1.2. Allowing SST_Local to generate Encryption_PW
      9.2.2. Optionally provide Encrypted_PKG restrictions which could include but not be limited to:
         9.2.2.1. Expiration date for Encrypted_PKG after which Encrypted_PKG will be unavailable for download
         9.2.2.2. Maximum number of downloads for Encrypted_PKG
10. Send_User then:
    10.1. Chooses between:
       10.1.1. Providing and entering Encryption_PW
       10.1.2. Allowing SST_Local to generate Encryption_PW
    10.2. Enters Encryption_PW (of complexity to be specified) if Send_User has chosen to do so
    10.3. Optionally, provides Encrypted_PKG restrictions which could include but not be limited to:
       10.3.1. Expiration date for Encrypted_PKG after which Encrypted_PKG will be unavailable for download
       10.3.2. Maximum number of downloads for Encrypted_PKG
    10.4. Closes Dialog Box affirmatively
11. SST_Local then:
    11.1. Generates Encryption_PW if Send_User has chosen to allow SST_Local to do so
    11.2. Saves Encryption_PW (whether generated by SST_Local or entered by Send_User)
    11.3. Uses universally available file combination/encryption software such as ZIP to combine and encrypt selected data file(s), if any, and Free_Text_File, if any, using saved Encryption_PW to produce Encrypted_PKG
       11.3.1. Alternative embodiment—Encrypted_PKG could be produced in a self-extracting format which would simplify process of separating and decrypting the Encrypted_PKG once received by Recv_User.
    11.4. Uploads to SST_Web_Server:
       11.4.1. Encrypted_PKG
       11.4.2. Recv_User_Data_File
       11.4.3. Dependent upon which embodiment of the Encryption_PW_Delivery_Protocol is being utilized by SST_Web_Server:
          11.4.3.1. None of the Encryption_PW, or
          11.4.3.2. A portion of the Encryption_PW, or
          11.4.3.3. All of the Encryption_PW
12. SST_Web_Server then:
    12.1. Indexes and stores Encrypted_PKG with Send_User registration information, Recv_User_Data_Sets from Recv_User_Data_File, and any portion of the Encryption_PW that was uploaded
    12.2. Generates Message_ID corresponding with the indexed/stored Encrypted_PKG, Send_User registration information, Recv_User_Data_Sets, and portion of the Encryption_PW, if any
       12.2.1. Alternative embodiment—Generates Message_ID_QRCode in addition to Message_ID or in lieu of Message_ID.
    12.3. Returns Message_ID to SST_Local
13. SST_Local then:
    13.1. Invokes "New Email" command on Send_User Device to create Notice_Email
    13.2. Implements email delivery receipt election (saved by SST_Local earlier in process)
    13.3. Implements email return receipt election (saved by SST_Local earlier in process)
    13.4. Writes Recv_User email address(es) into the TO: and CC: fields (saved by SST_Local earlier in process)
    13.5. Writes Send_User email address into the FROM: field (Send_User email address is known to SST_Local)
    13.6. Writes suitably descriptive information into the SUBJECT: field
    13.7. Writes information into Notice_Email message body (with suitably descriptive labels) which could include but not be limited to the following:
       13.7.1. Send_User_Verification_Protocol instructions for Recv_User to follow detailing how Recv_User can use Message_ID to verify source and authenticity of Notice_Email 13.7.2. Encrypted_PKG retrieval and decryption instructions for Recv_User to follow including full description of and instructions for retrieval and use of the File_Address_Hyperlink and/or File_Address_Label, which will be provided as part of the Send_User_Verification_Protocol, and completion of the Recv_User_Authentication_Protocol 13.7.3. Instructions for Recv_User to follow detailing how to download and install the universally available file combination/encryption software required to decrypt and separate the Encrypted_PKG.

It should be noted that installation of the universally available file combination/encryption software is required only once per Recv_User Device.

13.7.3.1. Alternative embodiment—If the Encrypted_PKG has been produced in a self-extracting format, the instructions would be adjusted accordingly.

13.7.4. Encrypted_PKG filename 13.7.5. If optionally elected by Send_User, a listing of the data file(s) and/or Free_Text_File contained in the Encrypted_PKG along with respective file information 13.7.6. Message_ID 13.7.6.1. Alternative embodiment—Message_ID_QRCode (in addition to Message_ID or in lieu of Message_ID)

13.7.7. Partially masked version of Recv_User phone number (inclusion could provide further assurance to Recv_User of authenticity of Notice_Email)

13.7.8. Dependent upon which embodiment of the Encryption_PW_Delivery_Protocol is being utilized by SST_Web_Server:

13.7.8.1. All of the Encryption_PW (unmasked and readable by any person viewing the Notice_Email), or 13.7.8.2. A portion of the Encryption_PW (unmasked and readable by any person viewing the Notice_Email), or 13.7.8.3. None of the Encryption_PW 13.7.9. Instructions for Recv_User to follow detailing how Recv_User can obtain assistance with any part of the transfer processes 13.7.10. Instructions for Recv_User to follow detailing how Recv_User can register with the Service_Provider so that Recv_User can utilize the Service_Provider for future secure file transfer needs of Recv_User It should be noted that, as is the case with any email, all Recv_Users listed in the TO: or CC: email fields will receive identical Notice_Emails including identical Message_ID, and portion of the Encryption_PW, if any.

13.8. Opens Dialog Box warning Send_User that text contained in Notice_Email body is not encrypted and that Send_User should not add any information that is intended to be kept confidential to the body of the Notice_Email 14. Send_User then:

14.1. Closes (warning) Dialog Box affirmatively 14.2. Sends Notice_Email to Recv_User through the existing email system utilized by Send_User Transfer of Encrypted Files by Send_User from Cloud Storage The following outline of a possible embodiment is based on implementation of SST+V, including the incorporation of the Send_User_Verification_Protocol, as a software program module incorporated into the software of a Cloud_Service_Provider providing cloud data storage services. Send_User is presumed to be registered with and to have already authenticated/logged in to the Cloud_Service_Provider website.

Possible Embodiment T-B

1. Send_User clicks SST+V "Transfer Files" command button in Cloud_Service_Provider web page 2. SST_Cloud_Server then:
   2.1. Opens Dialog Box which allows Send_User to:
      2.1.1. Create a Recv_User_Data_Set for each of one or more Recv_User(s) by entering required data elements of a Recv_User_Data_Set
      2.1.2. Elect whether to request email delivery receipt
      2.1.3. Elect whether to request email return receipt 3. Send_User then:
   3.1. Enters required data elements of a Recv_User_Data_Set for each intended Recv_User
      3.1.1. Alternative embodiment—if the Send_User utilizes an email program that incorporates a Contacts feature, SST_Cloud_Server could include functionality that would permit Send_User to add required Recv_User_Data_Set data elements for an intended Recv_User whose contact information exists in Contacts by clicking on or dragging and dropping the Recv_User's contact information as contained in the Contacts feature
      3.1.2. Elects whether to request email delivery receipt
      3.1.3. Elects whether to request email return receipt
   3.2. Closes Dialog Box affirmatively 4. SST_Cloud_Server then:
   4.1. Creates and saves Recv_User_Data_File using Recv_User_Data_Set(s) created by Send_User
   4.2. Saves email delivery receipt election
   4.3. Saves email return receipt election
   4.4. Opens Dialog Box which allows Send_User to:
      4.4.1. At option of Send_User, compose a Free_Text_File that will be securely transferred in the Encrypted_PKG
      It should be noted that creation of a Free_Text_File is not mandatory and that SST+V can be utilized to securely transfer data file(s) without an accompanying Free_Text_File.

5. Send_User then:
   5.1. Optionally, composes the contents of what will become the Free_Text_File using the text editing toolset offered by SST_Cloud_Server which could include but not be limited to Rich Text or HTML editing tools
      It should be noted that creation of a Free_Text_File is not mandatory and that SST+V can be utilized to securely transfer data file(s) without an accompanying Free_Text_File.
   5.2. Closes Dialog Box affirmatively 6. SST_Cloud_Server then:
   6.1. Creates and saves Free_Text_File if Send_User has opted to compose one
   6.2. Opens Dialog Box which allows Send_User to:
      6.2.1. At option of Send_User, choose data file(s) that will be securely transferred in the Encrypted_PKG
      It should be noted that selection of data file(s) is not mandatory and that SST+V can be utilized to securely transfer a Free_Text_File without accompanying data file(s).

6.2.2. Elect whether to include a file listing of the files, including any Free_Text_File file, to be transferred along with the respective file information of each such file which could include but not be limited to filename, file type, file size, date/time created, etc. with the file listing to be provided in unencrypted form in the body of the Notice_Email to Recv_User (while transfer of files that must be transferred under high security conditions might dictate that neither a file listing nor any other file information be provided in unencrypted form, inclusion of such information would provide an audit trail in the email systems of both the Send_User and the Recv_User of files sent by Send_User and received by Recv_User through SST+V)

7. Send_User then:
   7.1. Optionally, selects the data file(s) stored with Cloud_Service_Provider that are to be securely transferred
      It should be noted that selection of data file(s) is not mandatory and that SST+V can be utilized to securely transfer a Free_Text_File without accompanying data file(s).
   7.2. Elects whether to include a listing of files to be transferred, including any Free_Text_File, and respective file information in unencrypted form in the body of the Notice_Email to Recv_User
   7.3. Closes Dialog Box affirmatively
8. SST_Cloud_Server then:
   8.1. Creates and saves list of selected data file(s), if any, and/or a Free_Text_File, if any, to be securely transferred
   8.2. Opens Dialog Box which allows Send_User to:
      8.2.1. Choose between:
         8.2.1.1. Providing and entering an Encryption_PW
         8.2.1.2. Allowing SST_Cloud_Server to generate Encryption_PW
      8.2.2. Optionally provide Encrypted_PKG restrictions which could include but not be limited to:
         8.2.2.1. Expiration date for Encrypted_PKG after which Encrypted_PKG will be unavailable for download
         8.2.2.2. Maximum number of downloads for Encrypted_PKG
9. Send_User then:
   9.1. Chooses between:
      9.1.1. Providing and entering Encryption_PW
      9.1.2. Allowing SST_Cloud_Server to generate Encryption_PW
   9.2. Enters Encryption_PW (of complexity to be specified) if Send_User has chosen to do so
   9.3. Optionally, provides Encrypted_PKG restrictions which could include but not be limited to:
      9.3.1. Expiration date for Encrypted_PKG after which Encrypted_PKG will be unavailable for download
      9.3.2. Maximum number of downloads for Encrypted_PKG
   9.4. Closes Dialog Box affirmatively
10. SST_Cloud_Server then:
    10.1. Generates Encryption_PW if Send_User has chosen to allow SST_Cloud_Server to do SO
    10.2. Saves Encryption_PW (whether generated by SST_Cloud_Server or entered by Send_User)
    10.3. Uses universally available file combination/encryption software such as ZIP to combine and encrypt selected data file(s), if any, and Free_Text_File, if any, using the corresponding Encryption_PW to produce Encrypted_PKG
       10.3.1. Alternative embodiment—Encrypted_PKG could be produced in a self-extracting format which would simplify process of separating and decrypting the Encrypted_PKG once received by Recv_User.
    10.4. Indexes and stores Encrypted_PKG with Send_User registration information, Recv_User_Data_Sets from Recv_User_Data_File, and dependent upon which embodiment of the Encryption_PW_Delivery_Protocol is being utilized by SST_Cloud_Server:
       10.4.1. None of the Encryption_PW, or
       10.4.2. A portion of the Encryption_PW, or
       10.4.3. All of the Encryption_PW
    10.5. Generates Message_ID corresponding with the indexed/stored Encrypted_PKG, Send_User registration information, Recv_User_Data_Sets, and portion of the Encryption_PW, if any
       10.5.1. Alternative embodiment—Generates Message_ID_QRCode in addition to Message_ID or in lieu of Message_ID.
11. SST_Cloud_Server then:
    11.1. Generates a Notice_Email as follows:
    11.2. Implements email delivery receipt election (saved by SST_Cloud_Server earlier in process)
    11.3. Implements email return receipt election (saved by SST_Cloud_Server earlier in process)
    11.4. Writes Recv_User email address(es) into the TO: and CC: fields (Recv_User email address(es) saved by SST_Local earlier in process)
    11.5. Writes Recv_User email address(es) into the TO: and CC: fields (saved by SST_Cloud_Server earlier in process)
       11.5.1. Alternative embodiment—Writes Send_User email address into the BCC: field (Send_User email address is known to SST_Cloud_Server) so that Send_User receives same email message as Recv_User(s)
    11.6. Writes Send_User email address into the FROM: field (Send_User email address is known to SST_Cloud_Server)
    11.7. Writes suitably descriptive information into the SUBJECT: field
    11.8. Writes information into Notice_Email message body (with suitably descriptive labels) which could include but not be limited to the following:
       11.8.1. Send_User_Verification_Protocol instructions for Recv_User to follow detailing how Recv_User can use Message_ID to verify source and authenticity of Notice_Email
       11.8.2. Encrypted_PKG retrieval and decryption instructions for Recv_User to follow including full description of and instructions for retrieval and use of the File_Address_Hyperlink and/or File_Address_Label, which will be provided as part of the Send_User_Verification_Protocol, and completion of the Recv_User_Authentication_Protocol
       11.8.3. Instructions for Recv_User to follow detailing how to download and install the universally available file combination/encryption software required to decrypt and separate the Encrypted_PKG.
          It should be noted that installation of the universally available file combination/encryption software is required only once per Recv_User Device.
          11.8.3.1. Alternative embodiment—If the Encrypted_PKG has been produced in a self-extracting format, the instructions would be adjusted accordingly.
- 11.8.4. Encrypted_PKG filename
- 11.8.5. If optionally elected by Send_User, a listing of the data file(s) and/or Free_Text_File contained in the Encrypted_PKG along with respective file information
- 11.8.6. Message_ID
  - 11.8.6.1. Alternative embodiment—Message_ID_QRCode (in addition to Message_ID or in lieu of Message_ID)
- 11.8.7. Partially masked version of Recv_User phone number (inclusion could provide further assurance to Recv_User of authenticity of Notice_Email)
- 11.8.8. Dependent upon which embodiment of the Encryption_PW_Delivery_Protocol is being utilized by SST_Cloud_Server:
  - 11.8.8.1. All of the Encryption_PW (unmasked and readable by any person viewing the Notice_Email), or
  - 11.8.8.2. A portion of the Encryption_PW (unmasked and readable by any person viewing the Notice_Email), or
  - 11.8.8.3. None of the Encryption_PW
- 11.8.9. Instructions for Recv_User to follow detailing how Recv_User can obtain assistance with any part of the transfer processes
- 11.8.10. Instructions for Recv_User to follow detailing how Recv_User can register with the Cloud_Service_Provider so that Recv_User can utilize the Cloud_Service_Provider for future secure file transfer needs of Recv_User It should be noted that, as is the case with any email, all Recv_Users listed in the TO: or CC: email fields will receive identical Notice_Emails including identical Message_ID, and portion of the Encryption_PW, if any.

- 11.9. Opens Dialog Box warning Send_User that text contained in Notice_Email body is not encrypted and that Send_User should not add any information that is intended to be kept confidential to the body of the Notice_Email 12. Send_User then:
- 12.1. Closes (warning) Dialog Box affirmatively
- 12.2. Sends Notice_Email to Recv_User utilizing SST_Cloud_Server Transfer of Encrypted Files by a Commercial_Service_Provider The following outline of a possible embodiment is based on implementation of SST+V, including the incorporation of the Send_User_Verification_Protocol, by a provider of commercial services that, using data in possession of or accessible to the commercial services provider, would execute large scale distributions of confidential files and other confidential information to other parties which could include but not be limited to customers, employees, patients and trading partners.

Possible Embodiment T-C

1. SST_CSP_Server, using data internally stored by or otherwise accessible to the Commercial_Service_Provider:
   - 1.1. Generates a Recv_User_Data_File containing separate Recv_User_Data_Sets for each separate Recv_User to whom confidential files and other confidential information are to be transferred 2. SST_CSP_Server then:
   - 2.1. Generates a unique Encryption_PW for each separate Recv_User_Data_Set
   - 2.2. For each separate Recv_User, generates or retrieves confidential files and other confidential information and/or Free_TextFiles (ex. individualized cover letters) that are to be distributed/transferred by SST_CSP_Server
   - 2.3. Uses universally available file combination/encryption software such as ZIP to combine and encrypt confidential files and other confidential information, if any, and Free_Text_Files, if any, associated with each Recv_User_Data_Set using the corresponding Encryption_PW to produce separate Encrypted_PKGs corresponding with each separate Recv_User_Data_Set.
     - 2.3.1. Alternative embodiment—Encrypted_PKGs could be produced in a self-extracting format which would simplify process of separating and decrypting the Encrypted_PKG once received by Recv_User.
   - 2.4. Generates a unique Message_ID for each separate Recv_User_Data_Set
     - 2.4.1. Alternative embodiment—Generates Message_ID_QRCode in addition to Message_ID or in lieu of Message_ID.
   - 2.5. Merges Recv_User_Data_Sets, Encrypted_PKGs, Encryption_PWs, and Message_IDs to create a separate CSP_Data_Set for each Recv_User
   - 2.6. Creates a CSP_Data_File containing all CSP_Data_Sets 3. Using the CSP_Data_File, SST_CSP_Server generates a Notice_Email for each unique CSP_Data_Set as follows:
   - 3.1. Writes Recv_User email address into the TO: field
   - 3.2. Writes appropriate Commercial_Service_Provider email address into the FROM: field
   - 3.3. Writes suitably descriptive information into the SUBJECT: field
   - 3.4. Writes information into Notice_Email message body (with suitably descriptive labels) which could include but not be limited to the following:
     - 3.4.1. Send_User_Verification_Protocol instructions for Recv_User to follow detailing how Recv_User can use Message_ID to verify source and authenticity of Notice_Email
     - 3.4.2. Encrypted_PKG retrieval and decryption instructions for Recv_User to follow including full description of and instructions for retrieval and use of the File_Address_Hyperlink and/or File_Address_Label, which will be provided as part of the Send_User_Verification_Protocol, and completion of the Recv_User_Authentication_Protocol
     - 3.4.3. Instructions for Recv_User to follow detailing how to download and install the universally available file combination/encryption software required to decrypt and separate the Encrypted_PKG.
       It should be noted that installation of the universally available file combination/encryption software is required only once per Recv_User Device.
       - 3.4.3.1. Alternative embodiment—If the Encrypted_PKG has been produced in a self-extracting format, the instructions would be adjusted accordingly.
     - 3.4.4. Encrypted_PKG filename
     - 3.4.5. If optionally elected by Commercial_Service_Provider, a listing of the confidential files and other confidential information, if any, and Free_Text_Files, if any, contained in the Encrypted_PKG along with respective file information 3.4.6. Message_ID
   3.4.6.1. Alternative embodiment—Message_ID_QRCode (in addition to Message_ID or in lieu of Message_ID)
3.4.7. Partially masked version of Recv_User phone number (the inclusion of which could provide further assurance to Recv_User of authenticity of Notice_Email)
3.4.8. Dependent upon which embodiment of the Encryption_PW_Delivery_Protocol is being utilized by SST_CSP_Server:
   3.4.8.1. All of the Encryption_PW (unmasked and readable by any person viewing the Notice_Email), or
   3.4.8.2. A portion of the Encryption_PW (unmasked and readable by any person viewing the Notice_Email), or
   3.4.8.3. None of the Encryption_PW
3.4.9. Instructions for Recv_User to follow detailing how Recv_User can obtain assistance with any part of the transfer processes
4. SST_CSP_Server sends generated Notice_Emails using email systems utilized by the Commercial_Service_Provider Receipt of Encrypted Files by Recv_User
(The following outline of a possible embodiment is based on the presumption that the Recv_User has no prior experience with SST+V)

Possible Embodiment Re-A

1. Recv_User opens existing email program on Device utilized by Recv_User
2. Recv_User receives Notice_Email from Send_User through the existing email system utilized by Recv_User
  2.1. Notice_Email contents could include but not be limited to the following:
    2.1.1. Send_User_Verification_Protocol instructions for Recv_User to follow detailing how to use Message_ID to verify source and authenticity of Notice_Email and to subsequently obtain the File_Address_Hyperlink and/or File_Address_Label
    2.1.2. Encrypted_PKG retrieval and decryption instructions for Recv_User to follow including full description of and instructions for retrieval and use of the File_Address_Hyperlink and/or File_Address_Label, which will be provided as part of the Send_User_Verification_Protocol, and completion of the Recv_User_Authentication_Protocol
    2.1.3. Instructions for Recv_User to follow detailing how to download and install the universally available file combination/encryption software required to decrypt and separate the Encrypted_PKG.
      It should be noted that installation of the universally available file combination/encryption software is required only once per Recv_User Device.
      2.1.3.1. Alternative embodiment—If the Encrypted_PKG has been produced in a self-extracting format, the instructions would be adjusted accordingly.
    2.1.4. Encrypted_PKG filename
    2.1.5. If optionally elected by Send_User, a listing of the data file(s) and/or Free_Text_File contained in the Encrypted_PKG along with respective file information
    2.1.6. Message_ID
      2.1.6.1. Alternative embodiment—Message_ID_QRCode (in addition to Message_ID or in lieu of Message_ID)
    2.1.7. Partially masked version of Recv_User phone number (inclusion could provide further assurance to Recv_User of authenticity of Notice_Email)
    2.1.8. Dependent upon which embodiment of the Encryption_PW_Delivery_Protocol is being utilized by SST_Server:
      2.1.8.1. All of the Encryption_PW (unmasked and readable by any person viewing the Notice_Email), or
      2.1.8.2. A portion of the Encryption_PW (unmasked and readable by any person viewing the Notice_Email), or
      2.1.8.3. None of the Encryption_PW
    2.1.9. Instructions for Recv_User to follow detailing how to obtain assistance with any part of the transfer processes
    2.1.10. Instructions for Recv_User to follow detailing how Recv_User can register with the Service_Provider so that Recv_User can utilize the Service_Provider for future secure file transfer needs of Recv_User
3. Following Send_User_Verification_Protocol instructions, Recv_User executes Send_User_Verification_Protocol as follows:
  3.1. Opens Recv_User web browser
  3.2. Enters Verification_Site web address, ex. "sst.Service_Provider.com/verify", into web browser which results in Verification_Site prompting Recv_User to enter Message_ID
  3.3. Enters Message_ID into Verification_Site as prompted
  3.4. Verification_Site, utilizing Send_User registration information stored in SST_Server and information specific to the email corresponding with Message_ID, opens Dialog Box which provides Recv_User with:
    3.4.1. Send_User information and other relevant information which could include but not be limited to:
      3.4.1.1. Send_User identity
      3.4.1.2. Send_User organization
      3.4.1.3. Send_User phone number
      3.4.1.4. Send_User email address
      3.4.1.5. Send_User physical address
      3.4.1.6. Send_User IP address
      3.4.1.7. Recv_User email address(es)
      3.4.1.8. Email size
      3.4.1.9. Email date/time data
      3.4.1.10. Attachment count
      3.4.1.11. Hyperlink count
      3.4.1.12. Selected delivery options (Delivery receipt requested/Return receipt requested)
    3.4.2. "Retrieve" command button to click allowing Recv_User to retrieve File_Address_Hyperlink and/or File_Address_Label from Verification_Site
  3.5. Alternative embodiment—Following Send_User_Verification_Protocol instructions, Recv_User executes Send_User_Verification_Protocol as follows:
    3.5.1. If not already installed on Recv_User smartphone, downloads and installs Message_ID_QRCode_App onto Recv_User smartphone
    3.5.2. Opens Message_ID_QRCode_App and scans Message_ID_QRCode 3.5.3. Message_ID_QRCode_App opens Verification_Site in web browser on Recv_User smartphone
3.5.4. Verification_Site, utilizing Message_ID_QR-Code and Send_User registration information stored in SST_Server, opens Dialog Box which provides Recv_User with:
  3.5.4.1. Send_User information and other relevant information which could include but not be limited to:
    3.5.4.1.1. Send_User identity
    3.5.4.1.2. Send_User organization
    3.5.4.1.3. Send_User phone number
    3.5.4.1.4. Send_User email address
    3.5.4.1.5. Send_User physical address
    3.5.4.1.6. Send_User IP address
    3.5.4.1.7. Recv_User email address(es)
    3.5.4.1.8. Email size
    3.5.4.1.9. Email date/time data
    3.5.4.1.10. Attachment count
    3.5.4.1.11. Hyperlink count
    3.5.4.1.12. Selected delivery options (Delivery receipt requested/Return receipt requested)
  3.5.4.2. "Retrieve" command button to click allowing Recv_User to retrieve File_Address_Hyperlink and/or File_ Address_ Label from Verification_Site
3.6. Once Recv_User is satisfied of the authenticity of Notice_Email, Recv_User clicks on "Retrieve" command button located on Verification_Site to retrieve File_Address_Hyperlink and/or File_Address_Label.
3.7. Verification_Site or SST_Server generates File_Address_Hyperlink corresponding with Message_ID and presents File_Address_Hyperlink to Recv_User in Dialog box
  3.7.1. Alternative embodiment—Verification_Site or SST_Server generates File_Address_Label in lieu of File_Address_Hyperlink or in addition to File_Address_Hyperlink. This alternative embodiment would provide a higher level of security and/or could be used if the state of global cyber security deteriorates to the point that users do not trust any hyperlinks regardless of source.
It should be noted that a different File_Address_Hyperlink and/or File_Address_Label can be generated each time a Recv_User executes the Send_User_Verification_Protocol
4. Following Encrypted_PKG retrieval and decryption instructions in Notice_Email, Recv_User then clicks on File_Address_Hyperlink which initiates the following:
  4.1. Web browser opens new page/tab/window on Device utilized by Recv_User and calls SST_Server
    4.1.1. Alternative embodiment—If a File_Address_Label is utilized instead of a File_Address_Hyperlink, Recv_User will be instructed to copy the File_Address_Label from the Verification_Site Dialog Box and paste it into another location, application or screen which could include but not be limited to a data entry field on a web page or the address entry field in a web browser
5. SST_Server then executes Recv_User_Authentication_Protocol to verify Recv_User's identity as follows:
  5.1. Opens Dialog Box which allows Recv_User to:
    5.1.1. Choose Recv_User's phone number from list of partially masked phone numbers which could include but not be limited to phone numbers for all Recv_Users for which a Recv_User_Data_Set was provided by Send_User and decoy phone numbers (not applicable in the case of a transfer from a Commercial_Service_Provider).
    5.1.2. Choose whether to receive Authentication_Code via SMS or aurally via PHONE CALL
      5.1.2.1. Alternative embodiment—If Recv_User is registered with the Service_Provider (whether because [A] Recv_User has previously utilized the Service_Provider as a Send_User; or, [B] the Service_Provider is a Commercial_Service_Provider such as a bank or healthcare provider and Recv_User is registered with such Commercial_Service_Provider to receive confidential files and other confidential information via SST+V), SST_Server could offer Recv_User an additional option to authenticate utilizing available authentication tools including but not limited to tools such as Microsoft Authenticator, Google Authenticator, Authy, and Symantec VIP.
  5.2. Recv_User then:
    5.2.1. Chooses Recv_User's phone number from list of partially masked phone numbers (not applicable in the case of a transfer from a Commercial_Service_Provider)
    5.2.2. Chooses whether to receive Authentication_Code via SMS or aurally via PHONE CALL
      5.2.2.1. Alternative embodiment—If usage of SST+V becomes more widespread over time, there would be an increasing likelihood that:
        5.2.2.1.1. An individual who is an intended Recv_User would have previously registered with a Cloud_Service_Provider because of a prior need of that individual to transfer files to others as a Send_User, or,
        5.2.2.1.2. A Recv_User would have an existing relationship with or be previously registered with a Commercial_Service_Provider.
      Such widespread usage of SST+V and the resultant increase in the number of registered users of SST+V could render worthwhile the addition by a Service_Provider of a third option for delivery of the Authentication_Code to the Recv_User with the third option being delivery of the Authentication_Code using commonly available authentication applications which could include but not be limited to applications such as Microsoft Authenticator, Google Authenticator, Authy, and Symantec VIP.
    5.2.3. Closes Dialog Box affirmatively
  5.3. SST_Server then:
    5.3.1. Opens Dialog Box which provides Recv_User with:
      5.3.1.1. An "Authenticate" command button to click to initiate SMS or PHONE CALL (as chosen by Recv_User) to Recv_User phone number to deliver Authentication_Code to Recv_User
      5.3.1.2. A field in which to enter Authentication_Code after the same has been delivered by SST_Server via SMS or aurally via PHONE CALL as elected by Recv_User
        5.3.1.2.1. Alternative embodiment—If the Service_Provider has implemented an option to use an authentication application as outlined in item 5.2.2.1 above and the Recv_User is registered with the Service_Provider, the Recv_User would obtain the Authentication_Code from the authentication application.
  5.4. Recv_User then:
    5.4.1. Clicks to initiate the SMS or PHONE CALL to deliver Authentication_Code to Recv_User
      5.4.1.1. Alternative embodiment—If the Service_Provider has implemented an option to use an authentication application as outlined in item 5.2.2.1 above and the Recv_User is registered with the Service_Provider, the Recv_User would enter the Authentication_Code provided by the authentication application into the Dialog Box, close the Dialog Box affirmatively, and skips to item 6 below
  5.5. SST_Server then:
    5.5.1. Sends SMS or makes PHONE CALL and
      5.5.1.1. Delivers non-persistent (expiring) Authentication_Code to Recv_User
        It should be noted that because Recv_User can repeat Encrypted_PKG retrieval and decryption process at any time (subject to restrictions that may have been imposed by Send_User), Authentication_Code persistence can be very short; e.g. 30 seconds
      5.5.1.2. Dependent upon which embodiment of the Encryption_PW_Delivery_Protocol is being utilized by SST_Server, delivers:
        5.5.1.2.1. All of the Encryption_PW, or
        5.5.1.2.2. A portion of the Encryption_PW, or
        5.5.1.2.3. None of the Encryption_PW
  5.6. Recv_User then:
    5.6.1. Receives SMS or PHONE CALL (as requested) at Recv_User phone number which delivers Authentication_Code to Recv_User
    5.6.2. Enters Authentication_Code into Dialog Box
    5.6.3. Closes Dialog Box affirmatively
6. If Recv_User successfully authenticates, SST_Server then:
  6.1. Opens Dialog Box which allows Recv_User to:
  6.2. Direct where Encrypted_PKG should be saved
7. Recv_User then:
  7.1. Selects location where Encrypted_PKG is to be saved
  7.2. Closes Dialog Box affirmatively
8. SST_Server then:
  8.1. Downloads Encrypted_PKG to selected location
9. Recv_User, following decryption instructions in Notice_Email from Send_User, then:
  9.1. Decrypts and separates files in Encrypted_PKG using Encryption_PW which, dependent upon which embodiment of the Encryption_PW_Delivery_Protocol is being utilized by SST_Server, was delivered:
    9.1.1.1. In its entirety in the Notice_Email, or
    9.1.1.2. In part in the Notice_Email and in part via SMS or aurally via PHONE CALL in the Recv_User_Authentication_Protocol, or
    9.1.1.3. In its entirety via SMS or aurally via PHONE CALL in the Recv_User_Authentication_Protocol
  9.2. Is presented with decrypted file(s) in file manager on Device utilized by Recv_User
  9.3. Saves/Moves/Opens decrypted file(s) as desired Sending Verified_Email
The following outline of a possible embodiment is based on implementation of the VERIFICATION component of SST+V by a Cloud_Service_Provider as an Add-In to an existing email program installed on a Device utilized by Send_User which runs on Send_User Device as SST_Local. Send_User is presumed to be registered with and to have already authenticated/logged in to the Cloud_Service_Provider.

Possible Embodiment V-A

1. Send_User:
  1.1. Opens Send_User's existing email program on Send_User Device
  1.2. Creates email that is to be sent as a Verified_Email
  1.3. Selects email delivery options (ex. delivery receipt, read receipt)
  1.4. Clicks SST+V "Send Verified" Add-In command button in existing email program
2. SST_Local then uploads to SST_Web_Server details of email that is to be sent as Verified_Email which could include but not be limited to:
  2.1. Send_User identity
  2.2. Send_User IP address
  2.3. Recv_User email address(es)
  2.4. Email size
  2.5. Email date/time data
  2.6. Attachment count
  2.7. Hyperlink count
  2.8. Selected delivery options (Delivery receipt requested/Return receipt requested)
3. SST_Web_Server then:
  3.1. Indexes and stores details of email that is to be sent as Verified_Email with Send_User registration information and other information which could include but not be limited to date/time data
  3.2. Generates Message_ID corresponding with the indexed/stored details of email that is to be sent as Verified_Email and Send_User registration information
    3.2.1. Alternative embodiment—Generates Message_ID_QRCode in addition to Message_ID or in lieu of Message_ID.
  3.3. Returns Message_ID to SST_Local
4. SST_Local then:
  4.1. Writes information into Verified_Email message body which could include but not be limited to the following:
    4.1.1. Send_User_Verification_Protocol instructions for Recv_User to follow detailing how Recv_User can use Message_ID to verify source and authenticity of Verified_Email
    4.1.2. Message_ID
      4.1.2.1. Alternative embodiment—Message_ID_QRCode (in addition to Message_ID or in lieu of Message_ID)
    It should be noted that, as is the case with any email, all Recv_Users listed in the TO: or CC: email fields will receive identical Verified_Emails including identical Message_IDs.
    4.1.3. Sends Verified_Email to Recv_User through the existing email system utilized by Send_User Receipt of Verified_Email by Recv_User
(The following outline of a possible embodiment is based on the presumption that the Recv_User has no prior experience with SST+V)

Possible Embodiment RV-A

1. Recv_User opens existing email program on Device utilized by Recv_User
2. Recv_User receives Verified_Email from Send_User through the existing email system utilized by Recv_User 2.1. Verified_Email contents could include but not be limited to the following:
   2.1.1. Send_User_Verification_Protocol instructions for Recv_User to follow detailing how to use Message_ID to verify source and authenticity of Verified_Email
   2.1.2. Message_ID
3. Following Send_User_Verification_Protocol instructions, Recv_User executes Send_User_Verification_Protocol as follows:
   3.1. Opens Recv_User web browser
   3.2. Enters Verification_Site web address, ex. "sst.Service_Provider.com/verify", into web browser which results in Verification_Site prompting Recv_User to enter Message_ID
   3.3. Enters Message_ID into Verification_Site as prompted
   3.4. Verification_Site, utilizing Send_User registration information stored in SST_Web_Server and information specific to the email corresponding with Message_ID, opens Dialog Box which provides Recv_User with Send_User identifying information and details of the Notice_Email or Verified_Email which could include but not be limited to:
      3.4.1. Send_User identity
      3.4.2. Send_User organization
      3.4.3. Send_User phone number
      3.4.4. Send_User email address
      3.4.5. Send_User physical address
      3.4.6. Send_User IP address
      3.4.7. Recv_User email address(es)
      3.4.8. Email size
      3.4.9. Email date/time data
      3.4.10. Attachment count
      3.4.11. Hyperlink count
      3.4.12. Selected delivery options (Delivery receipt requested/Return receipt requested)
   3.5. Alternative embodiment—Following Send_User_Verification_Protocol instructions, Recv_User executes Send_User_Verification_Protocol as follows:
      3.5.1. If not already installed on Recv_User smartphone, downloads and installs Message_ID_QRCode_App onto Recv_User smartphone
      3.5.2. Opens Message_ID_QRCode_App and scans Message_ID_QRCode
      3.5.3. Message_ID_QRCode_App opens Verification_Site in web browser on Recv_User smartphone
      3.5.4. Verification_Site, utilizing Message_ID_QRCode and Send_User registration information stored in SST_Server, opens Dialog Box which provides Recv_User with Send_User identifying information and details of the Notice_Email or Verified_Email which could include but not be limited to:
         3.5.4.1. Send_User identity
         3.5.4.2. Send_User organization
         3.5.4.3. Send_User phone number
         3.5.4.4. Send_User email address
         3.5.4.5. Send_User physical address
         3.5.4.6. Send_User IP address
         3.5.4.7. Recv_User email address(es)
         3.5.4.8. Email size
         3.5.4.9. Email date/time data
         3.5.4.10. Attachment count
         3.5.4.11. Hyperlink count
         3.5.4.12. Selected delivery options (Delivery receipt requested/Return receipt requested)
   3.6. Once Recv_User is satisfied of the authenticity of Verified_Email, Recv_User reads and utilizes Verified_Email as delivered Automated Verification of Notice_Emails and Verified_Emails by Recv_User Email System Required elements that would enable an email program to automatically verify incoming Notice_Emails and Verified_Emails are in place or could readily be put into place. The following outline of a possible embodiment is based on implementation of SST+V, including the incorporation of the Send_User_Verification_Protocol, by a Cloud_Service_Provider as an Add-In to an existing email program installed on a Device utilized by Recv_User which runs on Recv_User Device as SST_Local. Recv_User is presumed to be registered with and to have full trust in the Cloud_Service_Provider.

Possible Embodiment RV-B

1. Recv_User opens existing email program on Device utilized by Recv_User
2. Recv_User receives Notice_Email or Verified_Email from Send_User through the existing email system utilized by Recv_User
   2.1. Notice_Email or Verified_Email contents could include but not be limited to the following:
      2.1.1. Send_User_Verification_Protocol instructions for Recv_User to follow detailing how to use Message_ID to verify source and authenticity of Notice_Email or Verified_Email
      2.1.2. Message_ID
3. Recv_User clicks SST+V "Verify Email" Add-In command button in existing email program
4. SST_Local executes Send_User_Verification_Protocol as follows:
   4.1. Transmits Message_ID to Verification_Site
   4.2. Verification_Site, utilizing Send_User registration information stored in SST_Web_Server and information specific to the email corresponding with Message_ID, returns to SST_Local Send_User identifying information and details of the Notice_Email or Verified_Email which could include but not be limited to:
      4.2.1. Send_User identity
      4.2.2. Send_User organization
      4.2.3. Send_User phone number
      4.2.4. Send_User email address
      4.2.5. Send_User physical address
      4.2.6. Send_User IP address
      4.2.7. Recv_User email address(es)
      4.2.8. Email size
      4.2.9. Email date/time data
      4.2.10. Attachment count
      4.2.11. Hyperlink count
      4.2.12. Selected delivery options (Delivery receipt requested/Return receipt requested)
   4.3. SST_Local compares returned Send_User identifying information and details of the Notice_Email or Verified_Email to information contained in Notice_Email or Verified_Email and provides feedback to Recv_User as to authenticity of Notice_Email or Verified_Email.
   4.4. Once Recv_User is satisfied of the authenticity of Notice_Email or Verified_Email, Recv_User reads and utilizes Notice_Email or Verified_Email as delivered.

Benefits of SST+V Transfer Component Over Current Proprietary Secure Email Systems
1. There are many Secure File Transfer Options (SFTOs) in the IT market universe. However, all typically suffer from serious shortcomings:
    1.1. Currently, SFTOs are continuously leapfrogging their competitors to deliver features which improve the use experience for the person and organization that is sending confidential information.
    1.2. None of the current SFTOs offer a simple user experience for the entity that is receiving confidential information.
    1.3. None of the current SFTOs offer a standardized user experience for the entity that is receiving confidential information.
    1.4. Current SFTOs typically operate within a closed environment and do not permit forwarding of messages or information to the email account of the entity that is receiving confidential information; i.e. the email system of the entity that is receiving confidential information does not reflect that any information was received. While SFTOs operating in a closed environment view such an arrangement as advantageous, entities who are the intended recipients find such arrangements to be complex and frustrating to navigate.
    1.5. Current SFTOs typically do not offer any simple means to "re-download" confidential information after the initial download.
    1.6. Current SFTOs typically require that the entity that is receiving confidential information click on a hyperlink in order to receive the confidential information. With the current state of global cyber security, requiring the use of hyperlinks to obtain information may rapidly become obsolete.
    1.7. Current SFTOs typically do not offer any means for the entity that is receiving confidential information to confirm the validity of an email used as part of the process of delivering the confidential information to the receiving entity.
    1.8. Current SFTOs require that time-consuming and burdensome procedures be followed by the entity that is receiving confidential information which include but are not limited to registration, sharing of personal information, creation and memorization of passwords.
    1.9. Entities receiving confidential information via current SFTOs typically "dislike" current SFTOs because of the time-consuming and burdensome procedure that must be followed in order to prior to receiving the confidential information.
2. Standardization and Simplification of Process of Receiving Confidential Information
    With SST+V, while how an Encrypted_PKG is transferred will depend based on the type of Send_User (an entity using SST+V Add-in to email program, an entity using Cloud_Service_Provider, or a Commercial_Service_Provider), how a Recv_User receives and decrypts an Encrypted_PKG is essentially unchanged irrespective of how the Encrypted_PKG was transferred. To the extent that utilization of SST+V increases, this standardization of the process will result in increased efficiency in how confidential files and other confidential information are transferred.
    The Recv_User:
    2.1. Is not required to register with any website or service provider to receive confidential files and other confidential information via SST+V.
    2.2. Is not required to authenticate with a user name and password on any website or service provider to receive confidential files and other confidential information via SST+V.
    2.3. Is not required to share any personal information with any website or service to receive confidential files and other confidential information via SST+V.
    2.4. Can receive a Notice_Email using virtually ANY email client or email system.
3. The incorporation of a Send_User_Verification_Protocol allows a Recv_User to instantly and securely verify the authenticity of a Notice_Email before clicking a hyperlink or following any instructions contained therein, SST+V provides a great and growing advantage over current secure email systems which do not incorporate such a feature.
4. Notice_Emails that are sent by Send_User remain within the existing email system of Send_User.
5. Notice_Emails that are received by Recv_User remain within the existing email system of Recv_User.
6. Notice_Emails that are received by Recv_User show that they have been sent by Send_User rather than by a service. As example of the latter, Citrix ShareFile emails show Edward Scheinuk <mail@sf-notifications.com> in the From: field.
7. Notice_Emails that are sent and received can be treated in exactly same fashion as any other email saved or stored within the respective existing email systems of Send_User and Recv_User.
    7.1. Send_User and Recv_User can move, label, categorize, or mark Notice_Emails that are sent or received using any means available within their respective existing email systems.
    7.2. Send_User and Recv_User can search for Notice_Emails that are sent or received using any means available within their respective existing email systems.
8. The files to be transferred are encrypted from the time that they are encrypted and uploaded to SST_Server until the time that they are decrypted and saved on Recv_User's Device.
    8.1. Except as noted below, at no time during the process will a Service_Provider be able to view or utilize the files contained in the Encrypted_PKG in any form or fashion.
        It should be noted that exceptions to this would apply with respect to a Commercial_Service_Provider given that a Commercial_Service_Provider, as the creator of the confidential files and other confidential information, would already have access to the confidential files and other confidential information being transferred. Additionally, a Service_Provider that provided data storage and distribution services would also already have access to any files stored with such a Service_Provider in whatever form (encrypted or unencrypted) in which they were stored.
9. SST+V allows transfer of file(s) of any size as opposed to email where files are typically limited with respect to the size that can be attached to an email.
10. SST_Server can maintain Encrypted_PKG for any length of time.
    10.1. Send_User can use SST_Server_Console as described in 14. below to retrieve the Encrypted_PKG and can decrypt and separate Encrypted_PKG using Encryption_PW that, depending on Encryption_PW_Delivery_Protocol utilized, is contained wholly or partly in the Notice_Email contained in Send_User's Sent Items and/or partly or wholly in SST_Server and retrievable using SST_Server_Console.

10.2. Recv_User has Notice_Email containing Message_ID and instructions in their Inbox (or wherever email was saved) and, subject to restrictions that may have been imposed by Send_User, can repeat Encrypted_PKG retrieval and separation/decryption process at any time in the future using Encryption_PW that, depending on Encryption_PW_Delivery_Protocol utilized, is contained wholly or partly in the saved Notice_Email and/or partly or wholly delivered to Recv_User in the Recv_User_Authentication_Protocol utilized to retrieve the Encrypted_PKG.

10.3. If necessary, Send_User can resend the original Notice_Email to Recv_User allowing Recv_User to download/decrypt/save file(s).

11. Subject to the Encryption_PW_Delivery_Protocol utilized, use of SST_Local running locally on Device utilized by Send_User in conjunction with SST_Web_Server ensures that the Cloud_Service_Provider (as host/operator of SST_Web_Server) never knows or stores the Encryption_PW so file(s) contained in Encrypted_PKG are never exposed even if the Service_Provider is hacked or otherwise compromised.

12. Subject to the Encryption_PW_Delivery_Protocol utilized, Recv_User (and anyone who surreptitiously receives Notice_Email) gets Encryption_PW but does not get Encrypted_PKG without Authentication_Code which can be only be received at the Recv_User phone number.

12.1. Largely eliminates possibility of confidential files and other confidential information contained in Encrypted_PKG being accidentally disseminated by means such as forwarding of Notice_Email or hacking of email system utilized by Send_User.

12.2. Largely eliminates possibility of confidential files and other confidential information contained in Encrypted_PKG being intentionally disseminated if Service_Provider is hacked or otherwise compromised and Encrypted_PKGs are obtained by unauthorized parties.

13. While all of the Encryption_PW_Delivery_Protocol embodiments defined herein could accomplish the necessary step of delivering Encryption_PW to Recv_User, the most secure means of delivering the Encryption_PW and the Encrypted_PKG to Recv_User, which largely eliminates the possibility of a successful "man in the middle" attack, is provided by the Encryption_PW_Delivery_Protocol embodiment that involves delivering a portion of the Encryption_PW in the Notice_Email and delivering the remaining portion of the Encryption_PW in the Recv_User_Authentication_Protocol.

14. Send_User (as a Registered User) or any other authorized user can login to SST_Server_Console and:
   14.1. Review table of Encrypted_PKG activity which could contain information including but not limited to:
      14.1.1. Encrypted_PKG upload information which could include but not be limited to:
         14.1.1.1. Date and Time that Encrypted_PKG was uploaded.
         14.1.1.2. IP Address that Encrypted_PKG was uploaded from.
         14.1.1.3. File size of Encrypted_PKG file.
         14.1.1.4. Recv_User information which could include but not be limited to:
            14.1.1.4.1. Contents of Recv_User_Data_Files and Recv_User_Data_Sets.
         14.1.1.5. Email delivery options (ex. delivery receipt, return receipt)
      14.1.2. Encrypted_PKG download information which could include but not be limited to:
         14.1.2.1. Number of Send_User_Verification_Protocol executions
         14.1.2.2. Number of retrievals of File_Address_Hyperlink and/or File_Address_Label
         14.1.2.3. File_Address_Hyperlink and/or File_Address_Label generated for each Encrypted_PKG download.
         14.1.2.4. Date and Time of download(s).
         14.1.2.5. IP Address that Encrypted_PKG was downloaded to.
         14.1.2.6. Number of Encrypted_PKG downloads.
         14.1.2.7. Number of unsuccessful Authentication_Code entry attempts by Recv_User.
         14.1.2.8. IP Address(es) of source(s) of unsuccessful Authentication_Code entries.
   14.2. Apply restrictions to Encrypted_PKG which could include but not limited to:
      14.2.1. Number of downloads permitted for:
         14.2.1.1. An individual Encrypted_PKG.
         14.2.1.2. One or more Recv_Users.
         14.2.1.3. All Encrypted_PKGs.
      14.2.2. Expiration date after which no downloads are permitted for:
         14.2.2.1. An individual Encrypted_PKG.
         14.2.2.2. One or more Recv_Users.
         14.2.2.3. All Encrypted_PKGs.
      14.2.3. Maximum number of Authentication_Code entry attempts permitted for:
         14.2.3.1. An individual Encrypted_PKG.
         14.2.3.2. One or more Recv_Users.
         14.2.3.3. All Encrypted_PKGs.
   14.3. Terminate Encrypted_PKG download for:
      14.3.1.1. An individual Encrypted_PKG.
      14.3.1.2. One or more Recv_Users.
      14.3.1.3. All Encrypted_PKGs.
   14.4. Download an Encrypted_PKG to retrieve, verify or use files contained therein.

15. SST+V is superior to a possible alternative method where SST_Server would send SMS containing Authentication_Code to Recv_User immediately subsequent to when Send_User uploaded the Encrypted_PKG and Recv_User phone number. If an SMS containing the Authentication_Code was sent to Recv_User immediately subsequent to when Send_User uploaded the Encrypted_PKG and Recv_User phone number:
   15.1. Authentication_Code would have to be persistent (non-expiring) given that Recv_User may not be at Recv_User Device allowing immediate use of Authentication_Code.
   15.2. A first time Recv_User may not understand what the SMS contains and may intentionally and/or unknowingly delete the SMS.
   15.3. A Recv_User who routinely receives many SMS messages may miss the SMS from SST_Server.
   15.4. A Recv_User could inadvertently delete the SMS message containing the Authentication_Code.
   15.5. The SMS message containing the persistent (non-expiring) Authentication_Code could inadvertently be exposed to other parties which could result in unauthorized access to the contents of the Encrypted_PKG.

16. SST+V is superior to a possible alternative method where the Encrypted_PKG is sent as an attachment to an email and the Encryption_PW is delivered via SMS or aurally via PHONE CALL.
  16.1. In the possible alternative method, file size would be limited to the lesser of the limitations imposed by the email system of the sending or receiving party.
  16.2. Many email security protocols currently in use will reject or quarantine (treat as spam) emails which contain encrypted or zipped files.

Benefits of SST+V Verification Component
1. Standardization and Simplification of Process of Verifying an Email
  With SST+V, while how a Verified_Email is sent could vary based on the type of Send_User (an individual using SST+V Add-in to email program, an individual using Cloud_Service_Provider, a Commercial_Service_Provider, etc.), how a Recv_User receives and verifies a Verified_Email are essentially unchanged irrespective of how the Verified_Email was sent. To the extent that utilization of SST+V increases, this standardization of the process will result in increased efficiency in how the origin of emails is verified.
  The Recv_User:
    1.1. not required to register with any website or service provider to receive verification information related to a Verified_Email.
    1.2. Is not required to authenticate with a user name and password on any website or service provider to receive verification information related to a Verified_Email.
    1.3. Is not required to share any personal information with any website or service to receive verification information related to a Verified_Email.
    1.4. Can receive and verify a Verified_Email using virtually ANY email client or email system.
2. The Send_User_Verification_Protocol allows a Recv_User to instantly and securely verify the authenticity of a Verified_Email before clicking a hyperlink or following any instructions contained therein, SST+V provides a great and growing advantage over email systems which do not incorporate such a feature.
3. Verified_Emails that are sent by Send_User remain within the existing email system of Send_User.
4. Verified_Emails that are received by Recv_User remain within the existing email system of Recv_User.
5. Verified_Emails that are sent and received can be treated in exactly same fashion as any other email saved or stored within the respective existing email systems of Send_User and Recv_User.
  5.1. Send_User and Recv_User can move, label, categorize, or mark Verified_Emails that are sent or received using any means available within their respective existing email systems.
  5.2. Send_User and Recv_User can search for Verified_Emails that are sent or received using any means available within their respective existing email systems.
6. SST_Server can maintain Verified_Email details for any length of time.
  6.1. Send_User can use SST_Server_Console as described in 14. below to retrieve the Verified_Email details.
  6.2. Recv_User has Verified_Email containing Message_ID in their Inbox (or wherever email was saved) and, subject to restrictions that may have been imposed by Send_User, can repeat Send_User_Verification_Protocol at any time in the future.
  6.3. If necessary, Send_User can resend the original Verified_Email to Recv_User.
7. The Cloud_Service_Provider never receives or stores the Verified_Email and Verified_Emails are never exposed even if the Cloud_Service_Provider is hacked or otherwise compromised.
8. Send_User (as a Registered User) or any other authorized user can login to SST_Server_Console and:
  8.1. Review table of Verified_Email activity which could contain information including but not limited to:
    8.1.1. Verified_Email data upload information which could include but not be limited to:
      8.1.1.1. Date and Time that Verified_Email data was uploaded.
      8.1.1.2. IP Address that Verified_Email data was uploaded from.
      8.1.1.3. Verified_Email detail data.
    8.1.2. Verified_Email activity information which could include but not be limited to:
      8.1.2.1. Number of Send_User_Verification_Protocol executions.
      8.1.2.2. Date and Time of Send_User_Verification_Protocol executions.
      8.1.2.3. IP Address(es) utilized for Send_User_Verification_Protocol executions.
      8.1.2.4. Number of Send_User_Verification_Protocol executions.
  8.2. Apply restrictions to Send_User_Verification_Protocol executions which could include but not limited to:
    8.2.1. Number of executions permitted for:
      8.2.1.1. An individual Verified_Email.
      8.2.1.2. One or more Recv_Users.
      8.2.1.3. All Verified_Emails.
    8.2.2. Expiration date after which no Send_User_Verification_Protocol executions are permitted for:
      8.2.2.1. An individual Verified_Email.
      8.2.2.2. One or more Recv_Users.
      8.2.2.3. All Verified_Emails.
  8.3. Terminate Send_User_Verification_Protocol executions for:
    8.3.1.1. An individual Verified_Email.
    8.3.1.2. One or more Recv_Users.
    8.3.1.3. All Verified_Emails.
9. The required elements that would enable an email program to automatically verify incoming Notice_Emails and Verified_Emails are in place or could readily be put into place. Accordingly, as SST+V achieves widespread adoption, established email systems could incorporate programming modules or Add-in modules which would recognize incoming Notice_Emails and Verified_Emails and which would utilize the Message_ID incorporated within the incoming Notice_Emails and Verified_Emails to automatically check parameters of the incoming Notice_Emails and Verified_Emails against parameters on record with the Service_Provider for the Message_ID.
10. Incorporation of automated email verification would further simplify the process of authenticating incoming Notice_Emails and Verified_Emails which would stimulate further and more rapid adoption of the processes.

| Parts List | |
|---|---|
| Reference numeral | Item |
| 20 | SST Web Server |
| 21 | Verification Site |

-continued

Parts List

| Reference numeral | Item |
|---|---|
| 22 | Device of Sending User 23 (personal computer or laptop, for example) |
| 23 | Sending User |
| 24 | Receiving User |
| 25 | Device of Receiving User 24 (personal computer or laptop, for example) |
| 26 | Phone of Receiving User 24 (smart phone or land line telephone, for example) |
| 27 | Dialog box |
| 28 | Dialog box |
| 29 | Dialog box |
| 30 | Dialog box |
| 31 | Receiving User Database (e.g., patient ID information) |
| 32 | Confidential Files Database (e.g., patient medical records or customer investment reports) |
| 40 | Cloud Server |
| 50 | SST CSP Server |
| 60 | Web address label or link |
| 61 | Notice e-message sent using embodiment of FIG. 5 |
| 62 | Message ID code |
| 63 | Encryption password |
| 65 | Notice e-message sent using embodiment of FIG. 6 |
| 70 | Notice e-message sent using embodiment of FIG. 7 |
| 75 | Notice e-message sent using embodiment of FIG. 8 |

Attached is information about embodiments discussed herein, including 4 sample facsimile e-messages (FIGS. 1-4) and 4 diagrams showing graphically how these embodiments work (FIGS. 5-8).

The foregoing embodiments are presented by way of example only; the scope of the present invention is to be limited only by the following claims.

The invention claimed is:

1. A system for facilitating verification of identity of a sender of an e-mail message by a receiving user and for facilitating secure transfer of encrypted files to a receiving user, comprising:
a computer program for facilitating sending of an e-mail message to a receiving user, the e-mail message including at least a web address of a trusted provider and a message identification code;
instructions about how the receiving user can access the web address of a trusted provider and, using the message identification code, verify the identity of the sender;
instructions about how the receiving user can securely download encrypted files without the receiving user setting up an account or a password, the transfer of encrypted files being facilitated by an authentication code sent to a telephone of the receiving user, and
instructions about how to verify the identity of the sender of the e-mail message without the receiving user setting up an account or a password, wherein
the computer program prompts the receiving user to enter the message identification code contained in the e-mail message into a website to receive verification of the identity of the sender of the e-mail message,
the sender is registered with and has been verified by the trusted provider, and
the computer program prompts the receiving user to choose to receive the authentication code to be sent to the telephone of the receiving user, and prompts the receiving user to enter the authentication code on a website to allow download of the encrypted files.

2. The system of claim 1, wherein:
the computer program prompts the receiving user to choose to receive the authentication code via text or aurally.

3. The system of claim 1, wherein:
the sender is an individual.

4. The system of claim 1, wherein:
the sender is a commercial institution having a database of information about and files for receiving users.

5. The system of claim 1, wherein:
the sender is a medical services provider having a database of information about and files for receiving users.

6. The system of claim 1, wherein the computer program is accessed by the sender through a device,
wherein the computer program prompts the sender to:
choose a file or files stored on or accessible using a device controlled by the sender to be securely transferred; and,
choose an encryption password, wherein the file or files are encrypted using the encryption password;
and wherein the computer program,
prompts the sender for a phone number of a receiving user;
uploads the encrypted file or files and receiving user phone number to a system server;
receives from a system server the message identification code generated by the system server which is uniquely associated with the encrypted file or files;
writes the message identification code into the e-mail;
writes at least a portion of the encryption password (unmasked) into the e-mail;
enables the sender to send the e-mail message including at least a portion of the encryption password to the receiving user;
displays a dialog box in a device of the receiving user when the receiving user accesses the system server using information in the e-mail message, wherein the receiving user enters the message identification code contained in the e-mail message, wherein the system server provides verifying information about the sender, wherein the dialog box shows a portion of the phone number and prompts the receiving user to choose whether to receive the authentication code via text message or aurally to the phone number;
sends the authentication code to the phone number using a the method chosen by the receiving user;
prompts the receiving user to enter the authentication code;
confirms accuracy of the authentication code for the encrypted file or files; and
prompts the receiving user to select a location to save the encrypted file or files.

7. The system of claim 6, wherein the device of the receiving user:
saves the encrypted file or files to the location;
prompts the receiving user to enter the encryption password; and
unencrypts the file or files.

8. The system of claim 6, wherein the devices are at least one of a mobile phone, tablet, personal computer, and other processing device.

9. The system of claim 6, wherein at least a portion of the encryption password is provided to the receiving user after the code is entered.

10. The system of claim 9, wherein at least a portion of the encryption password is sent by text message or aurally.

11. The system of claim 1, wherein the computer program is accessed by the sender through a device,
wherein the computer program prompts the sender to:
choose a file or files stored on or accessible using a device controlled by the sender to be securely transferred; and,
choose an encryption password;
and wherein the computer program,
prompts the sender for a phone number of a receiving user;
uploads the encrypted file or files and receiving user phone number to a system server;
receives from the system server the message identification code generated by the system server which is uniquely associated with the encrypted file or files;
writes the message identification code into the e-mail;
enables the sender to send the e-mail message to the receiving user;
displays a dialog box in a device of the receiving user when the receiving user accesses the system server using information in the e-mail message, wherein the dialog box shows a portion of the phone number and prompts the receiving user to choose whether to receive an authentication code via text message or via a voice call to the phone number;
sends the authentication code to the phone number using the method chosen by the receiving user;
prompts the receiving user to enter the authentication code;
confirms the accuracy of the authentication code for the encrypted file or files; and
prompts the receiving user to select a location to save the encrypted file or files.

12. The system of claim 11, wherein at least a portion of the encryption password is provided to the receiving user after the authentication code is entered.

13. The system of claim 11, wherein the encryption password is provided to the receiving user after the authentication code is entered.

14. The system of claim 1, wherein the computer program is accessed by the sender through a device,
wherein the computer program prompts the sender to:
choose a file or files stored on or accessible using a device controlled by the sender to be securely transferred;
and wherein the computer program,
prompts the sender for a phone number of a receiving user;
uploads the file or files and receiving user phone number to a system server;
receives from the system server the message identification code generated by the system server which is uniquely associated with the encrypted file or files;
writes the message identification code into the e-mail;
enables the sender to send the e-mail message to the receiving user;
displays a dialog box in a device of the receiving user when the receiving user accesses the system server using information in the e-mail message, wherein the dialog box shows a portion of the phone number and prompts the receiving user to choose whether to receive the authentication code via text message or aurally to the phone number;
sends the authentication code to the phone number using a method chosen by the receiving user;
prompts the receiving user to enter the authentication code;
confirms accuracy of the authentication code for the file or files; and
prompts the receiving user to select a location to save the file or files.

15. The system of claim 14, wherein the file or files are encrypted using an encryption password, and the entire encryption password is provided to the receiving user in the e-mail message.

16. The system of claim 1, wherein the computer program is accessed by the sender through a device, and the computer program
prompts the sender to: choose a file or files to be encrypted and securely transferred;
prompts the sender to designate the receiving user, the receiving user having a phone number accessible to the computer program;
generates a file identifier (which is a textual web address) for the encrypted file or files to be included in an e-mail message;
allows the receiving user to:
receive the e-mail message with the file identifier;
enter the file identifier into a browser and be presented with a dialog box requesting the authentication code;
receive the authentication code via the receiving user's telephone;
enter the authentication code into the dialog box requesting the code;
be presented with a dialog box to select a location to save the encrypted file or files;
select the encrypted file or files and enter an encryption password for unencrypting the file or files; and
save the unencrypted files or files to whatever location is desired by the receiving user.

17. The system of claim 16, wherein the file or files are accessible in a repository controlled by the computer program.

18. The system of claim 16, wherein the encryption password is generated by the computer program and the computer program sends the e-mail message.

19. The system of claim 16, wherein a dialog box displaying some portion of the receiving user's phone number is presented when the receiving user enters the file identifier into a browser).

20. The system of claim 16, wherein the encryption password is not included in the e-mail message, but instead is sent by text message or aurally.

21. The system of claim 20, wherein the encryption password is provided to the receiving user after the authentication code is entered.

22. The system of claim 16, wherein the encryption password is sent partly by e-mail and partly by text or aurally.

23. The system of claim 16, wherein the file identifier is a web address or file address label.

24. The system of claim 16, wherein the computer program generates the message identification code which is included in the e-mail message to facilitate verification of the authenticity of the e-mail message and the identity of the sender by the receiving user.

25. The system of claim 16, wherein the file identifier is a textual web address, not a hyperlink.

26. The system of claim 25, wherein the textual web address is a file address label.

27. The system of claim 1, wherein the encrypted file is accessible in a repository controlled by the computer program.

28. The system of claim 1, wherein the computer program runs on a system server hosted by a cloud services provider and the file or files to be encrypted and transferred is or are stored on the system server of the cloud services provider.

29. The system of claim 1, wherein:
the computer program prompts the receiving user to choose to receive the authentication code via text or aurally.

30. The system of claim 1, wherein the computer program generates a file identifier for the encrypted files to be included in the e mail message, and the file identifier is a textual web address, not a hyperlink.

31. A system for facilitating verification of identity of a sender of an e-mail message by a receiving user and for facilitating secure transfer of files to a receiving user, comprising:
a computer program for facilitating sending of an e-mail message to a receiving user, the e-mail message including at least a web address of a trusted provider and a message identification code;
instructions about how the receiving user can access the web address of a trusted provider and, using the message identification code, verify the identity of the sender;
instructions about how the receiving user can securely download files without the receiving user setting up an account or a password, the transfer of files being facilitated by an authentication code sent to a telephone of the receiving user, and
instructions about how to verify the identity of the sender of the e-mail message without the receiving user setting up an account or a password, wherein
the computer program prompts the receiving user to enter a message identification code contained in the e-mail message into a website to receive verification of the identity of the sender of the e-mail message,
the sender is registered with and has been verified by the trusted provider, and
the computer program prompts the receiving user to choose to receive the authentication code to be sent to the telephone of the receiving user, and prompts the receiving user to enter the authentication code on a website to allow download of the encrypted files.

32. The system of claim 31, wherein:
the computer program prompts the receiving user to choose to receive the authentication code via text or aurally.

33. The system of claim 31, wherein:
the sender is an individual.

34. The system of claim 31, wherein:
the sender is a commercial institution having a database of information about and files for receiving users.

35. The system of claim 31, wherein:
the sender is a medical services provider having a database of information about and files for receiving users.

36. A system for facilitating verification of identity of a sender of an e-mail message by a receiving user and for facilitating secure transfer of encrypted files to a receiving user, comprising:
a computer program for facilitating sending of an e-mail message to a receiving user, the e-mail message including at least a web address of a trusted provider and a message identification code;
instructions about how the receiving user can access the web address of a trusted provider and, using the message identification code, verify the identity of the sender;
instructions about how the receiving user can securely download encrypted files without the receiving user setting up an account or a password, the transfer of encrypted files being facilitated by an authentication code sent to a telephone of the receiving user; and
instructions about how to verify the identity of the sender of the e-mail message without the receiving user setting up an account or a password, wherein:
the computer program prompts the receiving user to enter the message identification code contained in the e-mail message into a website to receive verification of the identity of the sender of the e-mail message,
the sender is registered with and has been verified by the trusted provider,
the computer program prompts the receiving user to choose to receive the authentication code to be sent to the telephone of the receiving user, and prompts the receiving user to enter the authentication code on a website to allow download of the encrypted files, and
wherein the sender is a provider of services to receiving users and has a database of information about and files for receiving users.

37. The system of claim 36, wherein:
the sender is a commercial institution having a database of information about and files for receiving users.

38. The system of claim 36, wherein:
the sender is a medical services provider having a database of information about and files for receiving users.

39. The system of claim 36, wherein the computer program generates a file identifier for the encrypted files to be included in the e-mail message, and the file identifier is a textual web address, not a hyperlink.

* * * * *